(12) United States Patent
Zhang et al.

(10) Patent No.: US 7,941,360 B2
(45) Date of Patent: May 10, 2011

(54) METHODS AND SYSTEMS FOR TRADE COST ESTIMATION

(75) Inventors: Liye Zhang, Hoboken, NJ (US);
Stephen Vandermark, Barton (CA);
Manwani Amit, New York, NY (US);
Xavier Abdobal, London (FR)

(73) Assignee: Barclays Capital Inc., New York, NY (US)

( * ) Notice: Subject to any disclaimer, the term of this patent is extended or adjusted under 35 U.S.C. 154(b) by 442 days.

(21) Appl. No.: 11/770,205

(22) Filed: Jun. 28, 2007

(65) Prior Publication Data
US 2009/0006231 A1 Jan. 1, 2009

(51) Int. Cl.
*G06Q 40/00* (2006.01)
(52) U.S. Cl. ............................................. 705/37
(58) Field of Classification Search ............ 705/37
See application file for complete search history.

(56) References Cited

U.S. PATENT DOCUMENTS 7,110,974 B1 * 9/2006 Rust ............................... 705/37
7,440,920 B2 * 10/2008 Rust ............................... 705/37
2003/0233306 A1 * 12/2003 Madhavan et al. ........... 705/37
2006/0271469 A1 * 11/2006 Rust ............................... 705/37
2009/0125448 A1 * 5/2009 Borkovec et al. ......... 705/36 R

OTHER PUBLICATIONS

Almgren et al., "Optimal Execution of Portfolio Transactions," Dec. 2000 Journal of Risk, pp. 1-39.*
Perold, Andre F., "The Implementation Shortfall: Paper vs. Reality," Journal of Portfolio Management 14, No. 3. (Spring 1988): 4-9.

* cited by examiner

*Primary Examiner* — Lindsay M. Maguire
(74) *Attorney, Agent, or Firm* — Morgan Lewis & Bockius LLP

(57) ABSTRACT

In one aspect, the invention comprises: (a) calculating an average bid-ask spread of securities; (b) calculating values associated with one or more markets; (c) receiving and storing data regarding an order size for the securities; (d) receiving and storing data regarding an average daily volume of the securities traded on a specified market; (d) calculating data regarding expected historical volatility over a trading interval of the securities; (e) calculating data regarding an average rate of trading over the trading interval of the securities; and (f) calculating an estimated cost of trading the securities using data comprising a formula based on the average bid-ask spread, the values associated with one or more markets, the data regarding order size, the data regarding average daily volume, the data regarding expected historical volatility, and the data regarding an average rate of trading over the trading interval.

27 Claims, 24 Drawing Sheets vwap Slippage ~ SpreadIntra
(NYSE, 20 Quantile Bins, In Sample)

METHODS AND SYSTEMS FOR TRADE COST ESTIMATION

INTRODUCTION

Transaction costs are critical to portfolio managers and are widely recognized as a large determinant of investment performance. The most popular transaction cost measurement technique is the Implementation Shortfall (IS) methodology introduced by Perold (Perold, André F., "The Implementation Shortfall: Paper vs. Reality," Journal of Portfolio Management 14, no. 3 (spring 1988): 4-9). The IS metric is defined as the difference between the actual portfolio return and its paper return benchmark. Perold's metric is a sum of four components:

$$IS = C_d + C_e + C_i + C_o,$$

where
$C_d$=cost due to manager's delay $C_e$=explicit costs
$C_i$=implicit costs $C_o$=opportunity costs The cost due to manager's delay ($C_d$) can be captured by the difference of mid price between the time when the portfolio manager decides on the transaction and the time when the order is passed to a trader. Explicit costs ($C_e$) are the sum of commissions, fees, etc. Implicit costs ($C_i$) are calculated as the filled price minus mid price when the order was placed. Opportunity cost ($C_o$) is used to capture the cost for remaining unfilled part of the order.

Implicit costs may include spread cost, impact cost, etc. Both spread cost and impact cost are paid by liquidity demanders to liquidity providers. Implicit costs may also be called market impact.

In a paper by Almgren and Chriss (Almgren, Robert and Neil Chriss, "Optimal Execution of Portfolio Transactions," Journal of Risk, 3, 5-39 (2000)), two kinds of market impact are considered: temporary impact and permanent impact. In one aspect of the present invention, market impact is treated as having three components: instantaneous impact, temporary impact and permanent impact.

Permanent impact refers to impacts due to changes in the equilibrium price caused by trading, which remain for the life of a trade.

Temporary impact refers to temporary imbalances between supply and demand caused by trades which lead to temporary price movement from equilibrium.

Instantaneous impact refers to the cost related to spread.

Traders usually break a big trade ("parent order") into a series of small trades ("child orders"). In the present terminology: (a) instantaneous impact affects every single child order, but dissipates immediately; (b) permanent impact will accumulate to affect all following child orders; and (c) temporary impact has time duration between the instantaneous impact and permanent impact—it affects the current child order, then decays. Depending on certain characteristics of a current child order and how often subsequent child orders are submitted, a current temporary impact may have a large or small effect on subsequent child orders By taking market impact as a random variable and ignoring price appreciation, market impact can be decomposed as follows:

Market Impact=Instantaneous Impact+Temporary Impact+Permanent Impact

In one aspect, the invention comprises a system for estimating execution cost of a trade of one or more securities, comprising: (a) one or more computer processors operable to calculate an average bid-ask spread of the one or more securities; (b) one or more computer processors operable to calculate values associated with one or more markets; (c) one or more computer processors operable to receive and store data regarding an order size for the one or more securities; (d) one or more computer processors operable to receive and store data regarding an average daily volume of the one or more securities traded on a specified market; (d) one or more computer processors operable to calculate data regarding expected historical volatility over a trading interval of the one or more securities; (e) one or more computer processors operable to calculate data regarding an average rate of trading over the trading interval of the one or more securities; and (f) one or more computer processors operable to calculate an estimated cost of trading the one or more securities using data comprising a formula based on the average bid-ask spread, the values associated with one or more markets, the data regarding order size, the data regarding average daily volume, the data regarding expected historical volatility, and the data regarding an average rate of trading over the trading interval; wherein the formula comprises a first multiplicative product of at least one of the values associated with one or more markets and the average bid-ask spread.

In various embodiments: (1) the formula comprises a second multiplicative product of at least one of the values associated with one or more markets, a square of the expected historical volatility, and a ratio of the order size to the average daily volume; (2) the formula comprises a third multiplicative product of at least one of the values associated with one or more markets, a power of the average rate of trading, and a power of the expected historical volatility; (4) the formula comprises a sum of the first multiplicative product and the second multiplicative product; (5) the formula comprises a sum of the first multiplicative product, the second multiplicative product, and the third multiplicative product; (6) at least one of the values associated with one or more markets is related to trade rate; (7) at least one of the values associated with one or more markets is related to security-specific variables; (8) the security-specific variables comprise one or more of spread, market capitalization, and turnover; (9) the formula has the form: $ae + b\sigma^2 X/ADV + cv^\alpha \sigma^\beta$, where constants a, b, c, $\alpha$ and $\beta$ are values associated with various markets, e represents a average bid-ask spread of the one or more securities, X represents the order size, ADV represents average daily volume traded of the one or more securities, $\sigma$ represents expected historical volatility of the one or more securities over the trading interval, and v represents an average rate of trading over the trading interval.

In other aspects, the invention comprises software to provide the above-described system functionality, and methods for implementing that functionality.

DETAILED DESCRIPTION OF CERTAIN EMBODIMENTS

Figure 1:
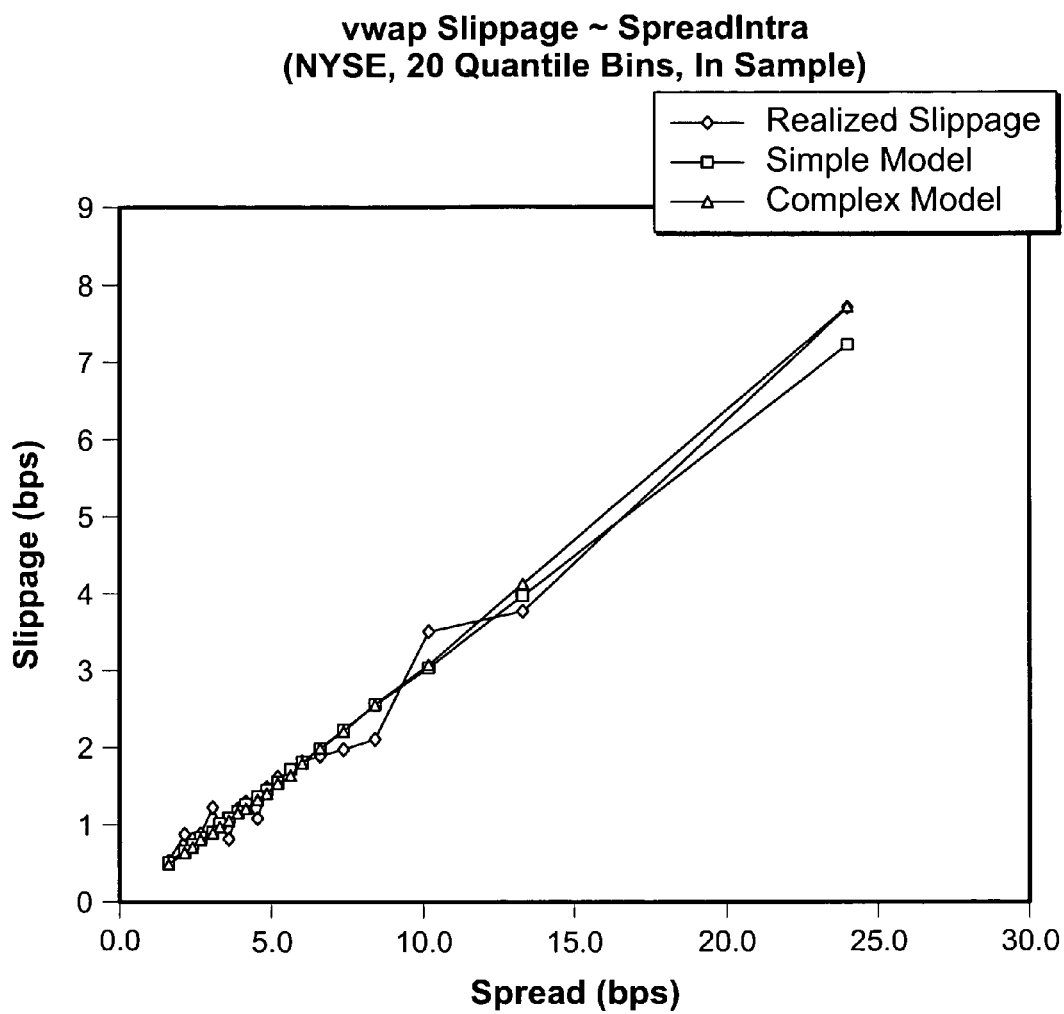
FIGS. 1 and 2 depict NYSE in-sample graphs (vs. spread and vs. trade rate, respectively).

A quantitative analysis of market impact based on a large sample of LMX executions is described below. Nine months of LMX trades (Oct. 1, 2004~Jun. 30, 2005) were used to conduct the analysis. Different filter conditions for a preferred VWAP slippage model and a preferred market impact model were applied. For the VWAP slippage model, the following filters were applied:

a. $\geq 500$ shares executed;
b. Fully executed;
c. VWAP strategy only;
d. Duration $\geq 30$ minutes;
e. Outlier filtering;

For the market impact model, the following filters were applied:

a. $\geq 2000$ shares executed.
b. Executed quantity is $\geq 1\%$ of ADV5D.
c. Finish before 15:30.
d. Trading duration $\geq 10$ minutes.
e. Outlier filter Each dataset was separated into: (a) a training set to fit the model; and (b) a validation set to test the model. NYSE and NASDAQ data were studied separately.

For every trade, the following variables preferably are extracted:

$S_0/S_{end}$—mid price before/after the first/last child order execution
$S_{exec}$—average execution price on the order
$S_C^0$—close price on current day
$S_O^1/S_C^1$—open/close price on next day
$S_{VWAP}$—VWAP price during the trading period
$S_{VWAP,ex}$—VWAP price excluding our own trades during the trading period
N—total executed shares
$ADV_{5D}$—average daily volume for the past 5 business days
SPRD—average bid ask spread for the past 10 business days.
VOL—daily volatility for the past 30 business days.
T—duration of the trade in days.
MktCap—market capitalization for the stock
$INV_{TO}$—InvTurnover=MktCap/($ADV_{5D} \cdot S_C^0$)

The descriptive information is listed in the following table:

The dataset preferably is divided into two strategy datasets. A preferred With-Volume strategy dataset has a shorter duration and a correspondingly higher trade rate than a VWAP strategy dataset. For the first try to fit the VWAP slippage model, we decide to use a VWAP dataset only because most of the With-Volume trades have a too-short duration, which makes the data very noisy; on the other hand, the expectation of VWAP slippage should be independent of duration. Therefore, using a VWAP dataset only should not introduce bias towards duration. A preferred market impact model combines VWAP and With-Volume trades together. Otherwise, there will be a bias toward trade duration.

NASDAQ trades have more market impact than NYSE trades. So in the embodiment described below, the dataset is analyzed according to the two different exchanges separately. In other embodiments, trades are separated according to duration, start time, and market cap.

Market Impact Model

Assuming the trading rate v over the volume time interval T is constant, then $$v = \frac{N}{ADV_{5D} * T}.$$

This assumption is reasonable for the dataset because both VWAP and With-Volume strategies try to trade at a constant trading rate.

Let P(t) denote permanent impact induced price trajectory; T(t) denote temporary impact induced price trajectory; and I(t) denote instantaneous impact induced price trajectory. Then Market mid price trajectory: $S(t)=P(t)+T(t)-S_0$ Trading price trajectory: $S(t)=P(t)+T(t)+I(t)-2S_o$ Expected permanent impact:

$$I_{PMN} = \frac{1}{T}\int_0^T \frac{P(t)-S_0}{S_0} dt$$

TABLE 1

|  | VWAP(UN) | WithVolume(UN) | VWAP(UQ) | WithVolume(UQ) |
| --- | --- | --- | --- | --- |
| Number of trades | 14592 | 17265 | 8326 | 9140 |
| Mean/Median duration (minutes) | 145.67/122 | 76.64/52 | 153/123 | 96.6/70 |
| Mean/Median % ADV | 2.74%/1.89% | 2.84%/2.05% | 2.91%/1.97% | 3.49%/2.45% |
| Mean/Median trade rate | 10.27%/6.92% | 22.55%/16.93% | 10.28%/6.87% | 21.67%/14.78% |
| Mean/Median spread (bps) | 5.92/4.98 | 6.45/5.32 | 9.30/8.05 | 10.58/9.05 |
| Mean/Median daily volatility | 1.57%/1.41% | 1.60%/1.46% | 2.43%/2.25% | 2.50%/2.27% |
| Mean/Median market cap ($mil) | 9828/2705 | 7666/2520 | 1859/741 | 1440/664 |
| Mean/Median implementation shortfall (bps) | 14.67/11.16 | 18.32/13.01 | 28.41/19.54 | 32.95/22.44 |
| Std Deviation implementation shortfall (bps) | 59.63 | 52.13 | 93.07 | 83.31 |

Expected temporary impact:

$$I_{TMP} = \frac{1}{T}\int_0^T \frac{T(t) - S_0}{S_0} dt$$

Expected instantaneous impact:

$$I_{INS} = \frac{1}{T}\int_0^T \frac{I(t) - S_0}{S_0} dt$$

Average execution price: $S_{exec} = (I_{PMN} + I_{TMP} + I_{INS} + 1)S_0$
Total market impact:

$$I_{MKT} = \frac{S_{exec} - S_0}{S_0} = \frac{1}{T}\int_0^T \frac{S(t) - S_0}{S_0} dt$$

$$= \frac{1}{T}\int_0^T \frac{P(t) + T(t) + I(t) - 3S_0}{S_0} dy$$

$$= I_{PMN} + I_{TMP} + I_{INS}$$

VWAP during the trading period:

$$S_{vwap} = \frac{1}{T}\int_0^T ((1-v)S(t) + vS(t))dt$$

$$= (I_{PMN} + I_{TMP} + 1 + vI_{INS})S_0$$

VWAP excluding our own trades during the trading period:

$$S_{vwap,ex} = \frac{1}{T}\int_0^T S(t)dt = \frac{1}{T}\int_0^T (P(t) = T(t) - S_0)dt$$

$$= (I_{PMN} + I_{TMP} + 1)S_0$$

Expected VWAP slippage benchmarked to VWAP excluding our trades ($S_0$ is used as denominator for simplicity. Preferably, the denominator is $S_{VWAP,ex}$):

$$V_{S,ex} = \frac{S_{execp} - S_{vwap,ex}}{S_0} = I_{INS} \quad (1)$$

Expected VWAP slippage benchmarked to VWAP ($S_0$ is used as denominator for simplicity. Preferably, the denominator is $S_{VWAP}$):

$$V_S = \frac{S_{exec} - S_{vwap}}{S_0} = I_{INS}(1-v) = V_{S,ex}(1-v) \quad (2)$$

Instantaneous Impact $I_{INS}$

Instantaneous impact only affects every child order and then dissipates immediately, so it disappears as soon as trading stops. In the preferred model, $I_{INS}$ is expressed as a function of spread and trade rate. Trade rate is considered to be a variable in the function because, if one sends a large order that is larger than the available bid size/ask size, then one may need to use liquidity from a higher or lower level of the order book.

Equation (1) says that instantaneous impact may be captured through $V_{S,ex}$. $V_{S,ex}$ may be computed directly from LMX or other trade data, then regressed against spread, trade rate and other related variables to get an empirical function form of $V_{S,ex}$: $V_{S,ex} = F(SPRD,v)$, which equals Instantaneous Impact. Then $V_{S,ex}$ can be used in equation (2) for the preferred VWAP slippage model.

Permanent Impact $I_{PMN}$ and Temporary Impact $I_{TMP}$
Preferred Linear Superposition Methodology In the preferred framework, trading impact can be expressed as the convolution of the trade impulse function and the impulse response function. In the preferred model, the impulse function g is a function of the trade rate: g:g(v), and the impulse response function h is in the form of a power law of time: $h(t) \sim t^{\beta-1}$, with parameter $\beta$ to be estimated from regression. This approach may be used to compute both permanent impact induced price trajectory and temporary impact induced price trajectory, which we denote as U(t) in the following description.

Let y(t) denote the convolution. Then, when $t \leq T$, $$y(t) = g * h = \int_0^t g(v)h(t - \tau)$$

$$= g(v)\int_0^t (t - \tau)^{\beta-1} d\tau$$

$$= g(v)\frac{t^\beta}{\beta}, \text{ and}$$

$$U(t) = U(0) \cdot (1 + y(t))$$

$$= U(0) \cdot \left(1 + g(v)\frac{t^\beta}{\beta}\right)$$

Then, average price is (for duration T):

$$\overline{U} = \frac{1}{T}\int_0^T U(t)dt = U(0) \cdot \left(1 + g(v) \cdot \frac{T^\beta}{\beta(\beta+1)}\right)$$

Thus, implementation shortfall equals to:

$$\frac{\overline{U} - U(0)}{U(0)} = g(v)\frac{T^\beta}{\beta(\beta+1)}$$

When $t > T$, $$y(t) = g * h = \int_0^T g(v)h(t - \tau)d\tau$$

$$= g(v)\int_0^T (t - \tau)^{\beta-1} d\tau$$

$$= g(v) * \left(\frac{t^\beta}{\beta} - \frac{(t-T)^\beta}{\beta}\right)$$

$$U(t) = U(0) \cdot (1 + y(t))$$

$$= U(0) \cdot \left(1 + g(v) \cdot \left(\frac{t^\beta}{\beta} - \frac{(t-T)^\beta}{\beta}\right)\right)$$

We know that there is no mean reversion for permanent impact, which means the price will not change after trading. So, $U(T) = U(t)$ for any $t > T$, which yields $\beta = 1$. Thus, $$I_{PMN} \sim g(v)T$$

Also, there is mean reversion for temporary impact, which means the impact will decay after trading. So $U(T) > U(t)$ for any $t > T$, which yields $0 < \beta < 1$. Thus, $$I_{TMP} \sim g(v)T^\beta$$

Because the temporary impact decays, if one waits long enough, the price left will be due to permanent impact only. In this embodiment, 3 benchmarks are used: close, next day's open, and next day's close, to capture the permanent impact. After the function form of the permanent impact is obtained, permanent impact cost and instantaneous impact cost are subtracted from realized impact cost, and the remainder is used to fit temporary impact function form. The details are explained below.

Dimensionless Form

Market impact $I_{MKT}$ is captured in basis points, which are dimensionless. On the other hand, the coefficients should be independent of time and execution shares. Consequently, impact is expressed in the general form: $v^{\alpha}(\sigma\sqrt{T})^{\beta}$.

For permanent impact, $\beta=2$, with $\alpha$ to be determined.

For temporary impact, $0<\beta<2$, so both $\alpha$ and $\beta$ need to be determined.

Non-Arbitrage Argument

When the price impact is time stationary, only linear price-impact functions rule out arbitrage. And when the temporary and permanent effects of trades on prices are independent, only the permanent price impact must be linear, while the temporary one can be of a more general form. The main idea behind this is that a trader should not earn a positive profit by buying and then selling the same number of shares of the same security. For permanent impact, all of the above requirements are satisfied only when $\alpha=1$ and $\beta=2$. So the formula for permanent impact becomes:

$$I_{PMN} \sim \varsigma \frac{N}{ADV_{SD}} \sigma^2$$

where $\varsigma$ represents stock specific variables (spread, market cap, turnover, etc.).

VWAP Slippage Model Fit

As discussed above, market impact preferably is decomposed to three parts instantaneous impact, temporary impact, and permanent impact. Instantaneous impact, which is a function of spread and trade rate, is related to a VWAP slippage model. The following analysis was performed on a VWAP slippage dataset:
a. separated data based on NYSE and NASDAQ exchanges;
b. compared both VWAP and VWAPN (VWAP without our trades) as benchmarks;
c. tried to fit different variables into the function and made the decision based on t stats and lasso regression results;
d. compared both average spread and intraday spread as spread term;
e. least square, nonlinear least square, ridge regression and lasso variable selection techniques were used; and
f. in-sample results were tested on out-of-sample data.

Based on that analysis, the following conclusions were reached:

1) NYSE and NASDAQ datasets display similar behavior: VWAP slippage depends on both spread and trade rate.
2) Log(mktCap), volatility, spread, and trade rate were tried; spread and trade rate were found to be the 2 most significant factors.
3) VWAPN is a better benchmark than VWAP on both NYSE and NASDAQ.
4) Intraday spread is better than average spread for NYSE, and average spread is better than intraday spread for NASDAQ.

After testing an assortment of variables and combinations using a correlation matrix, t stats and lasso parameters selection, one simple model and one complex model were discovered to work well.

A. The simple model is a one-variable model that is a function of spread only. Since instantaneous impact accounts for only a small part of total market impact, $(1-v)$ is not adjusted, for simplicity. The fitting results are:

$$I_{INS} = V_S = C_{sprd} \cdot \text{SPRD}$$

$C_{sprd}$ is calibrated separately for both NYSE and NASDAQ

B. The complex model is a two-variable model that is a function of spread and trade rate. We will adjust $(1-v)$ for completeness. Both models are discussed below; the simple model is used for the instantaneous part, for total impact calibration for this embodiment. Other embodiments may integrate the complex model into total impact calibration. The fitting results are:

$$I_{INS} = V_{S,ex} = C_{sprd} \cdot \text{SPRD} + C_{trdRate} \cdot \text{SPRD} \cdot v^{\gamma} \text{ and } V_S = V_{S,ex} \cdot (1-v)$$

$C_{sprd}$, $C_{trdRate}$, $\gamma$ are calibrated separately for both NYSE and NASDAQ FIGS. 1-8 display in-sample fit and out-of-sample fit results. The x-axis corresponds to independent variables (spread and trade rate); and the y-axis corresponds to slippage. The three lines in the figures are: realized slippage from the data and model predictions using simple and complex models.

Figure 2:
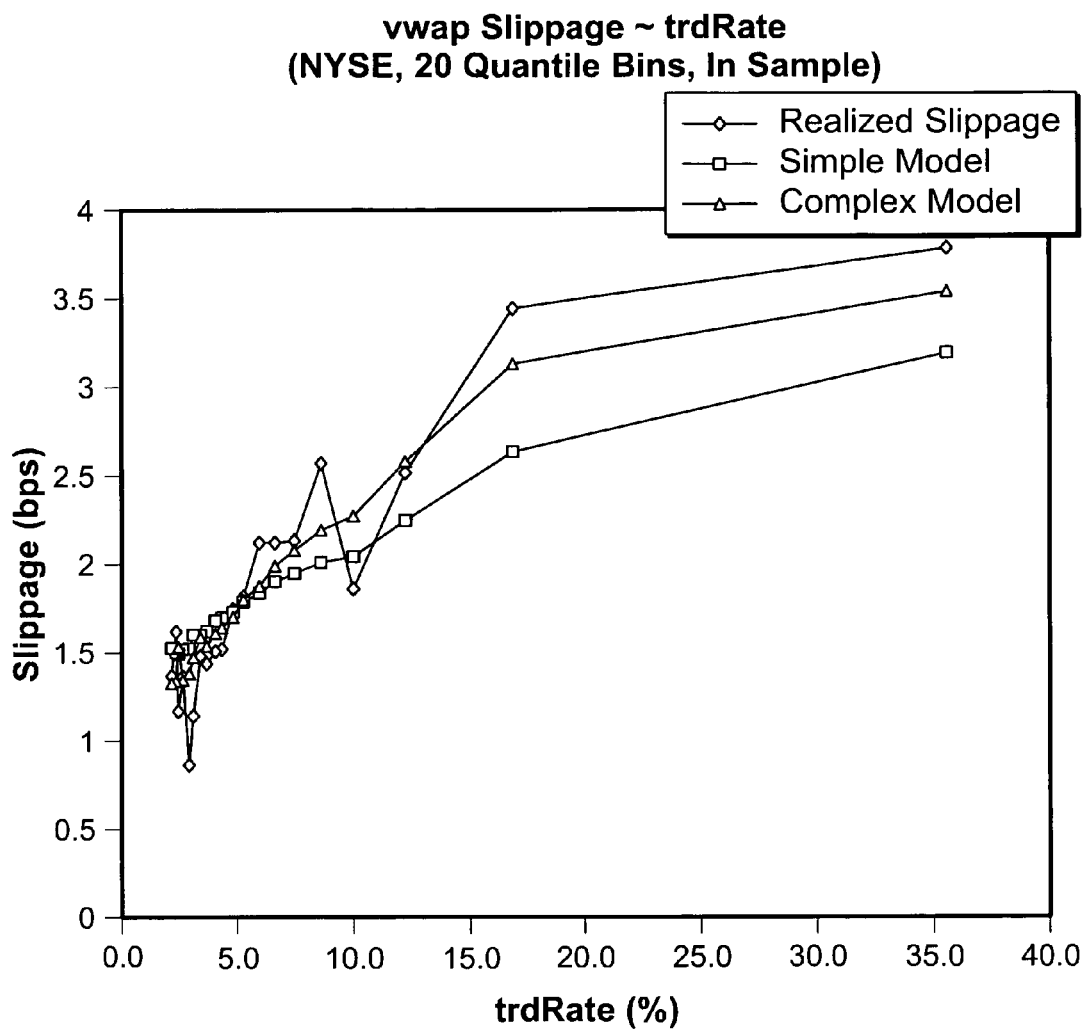

FIGS. 1 and 2 depict NYSE in-sample graphs (vs. spread and vs. trade rate, respectively).

Figure 3:
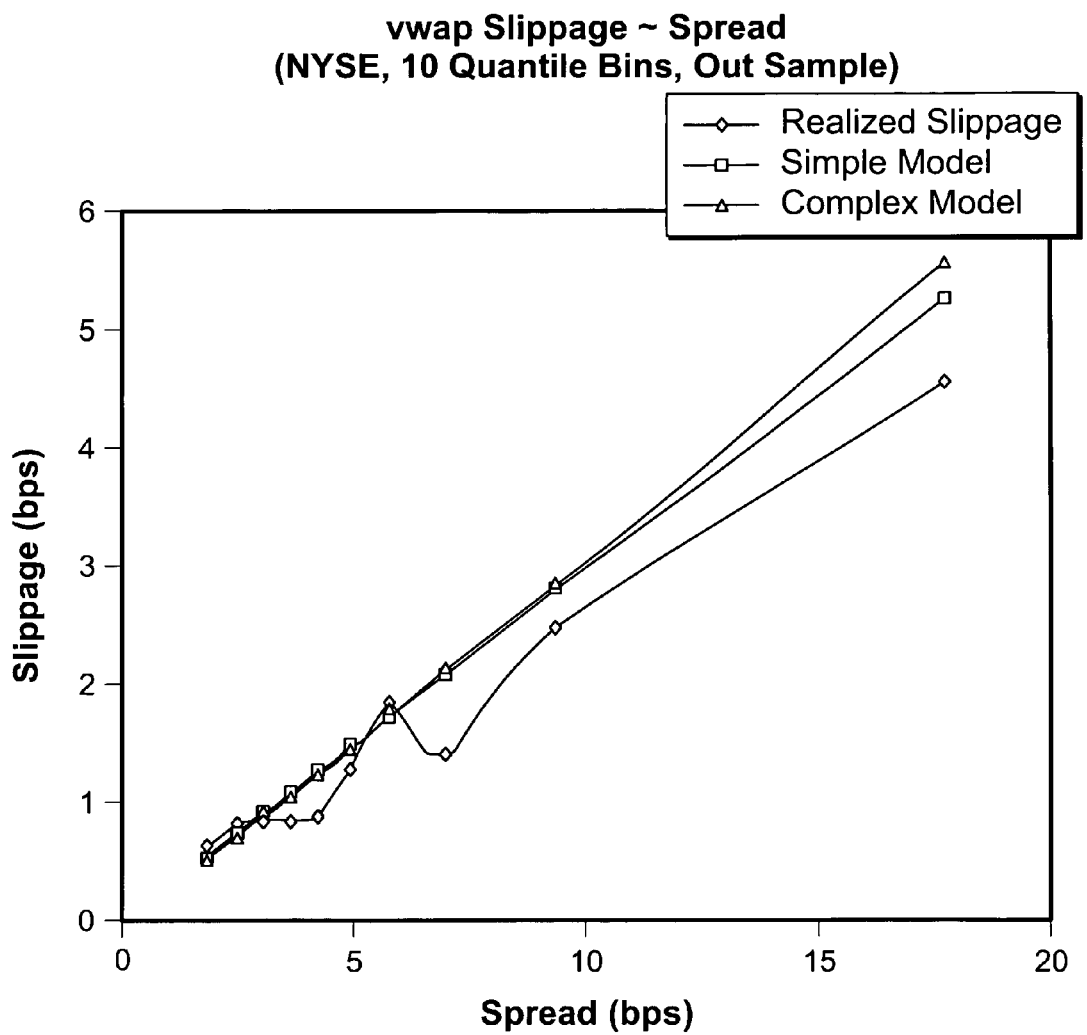
FIGS. 3 and 4 depict NYSE out-of-sample graphs (vs. spread and vs. trade rate, respectively).
Figure 4:
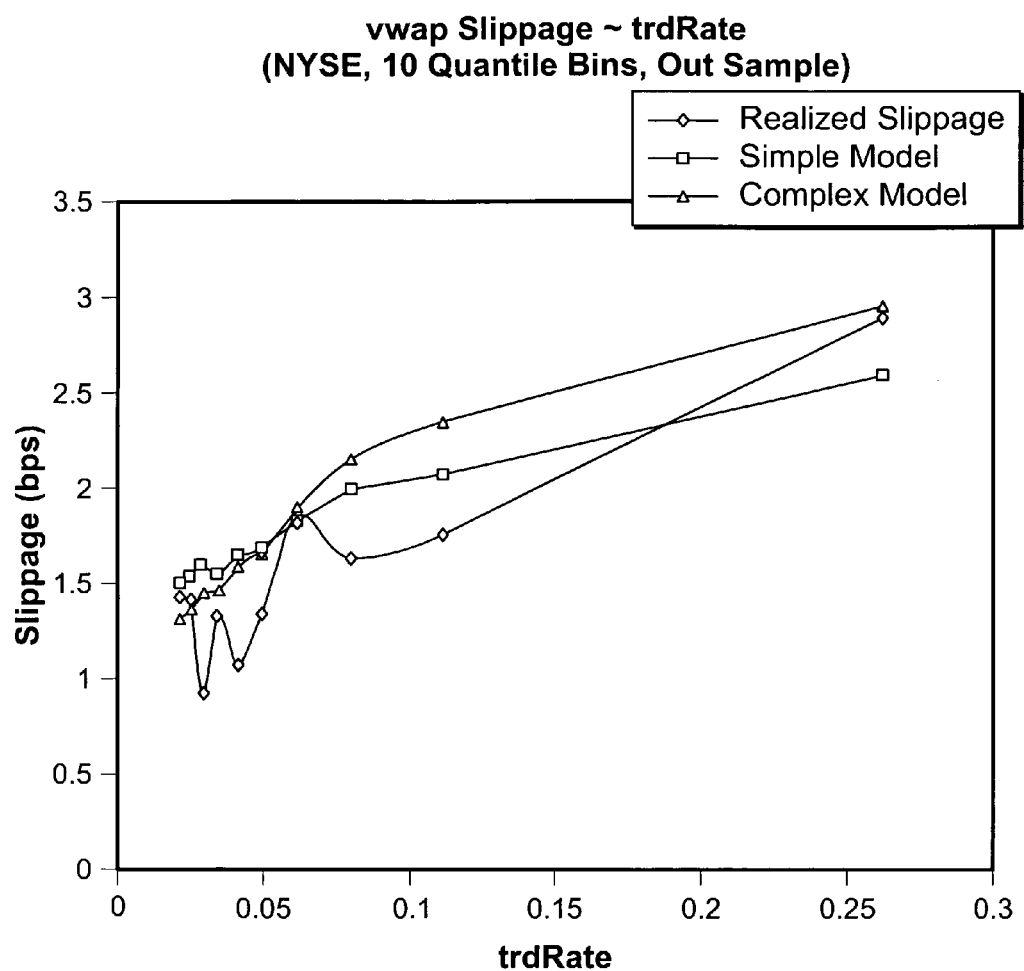

FIGS. 3 and 4 depict NYSE out-of-sample graphs (vs. spread and vs. trade rate, respectively).

Figure 5:
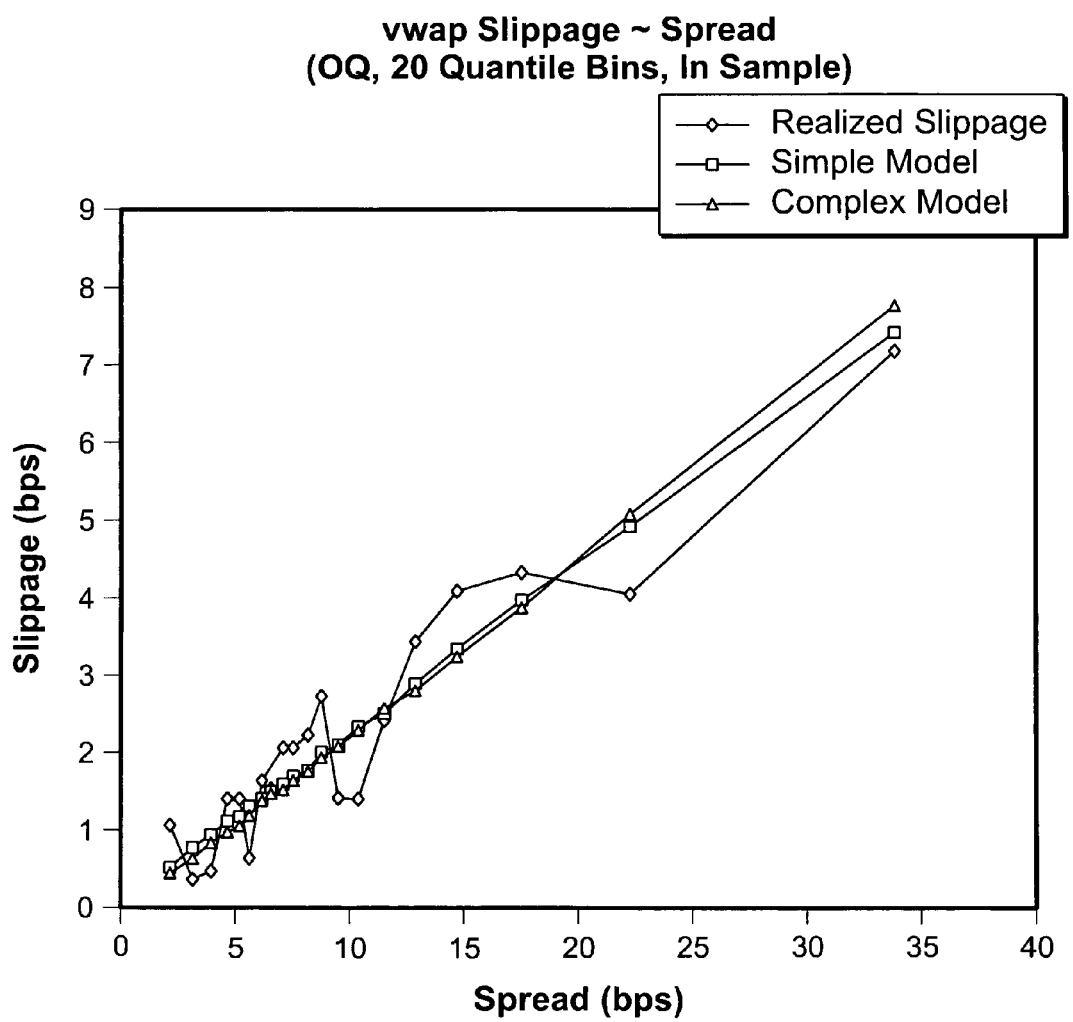
FIGS. 5 and 6 depict NASDAQ in-sample graphs (vs. spread and vs. trade rate, respectively).
Figure 6:
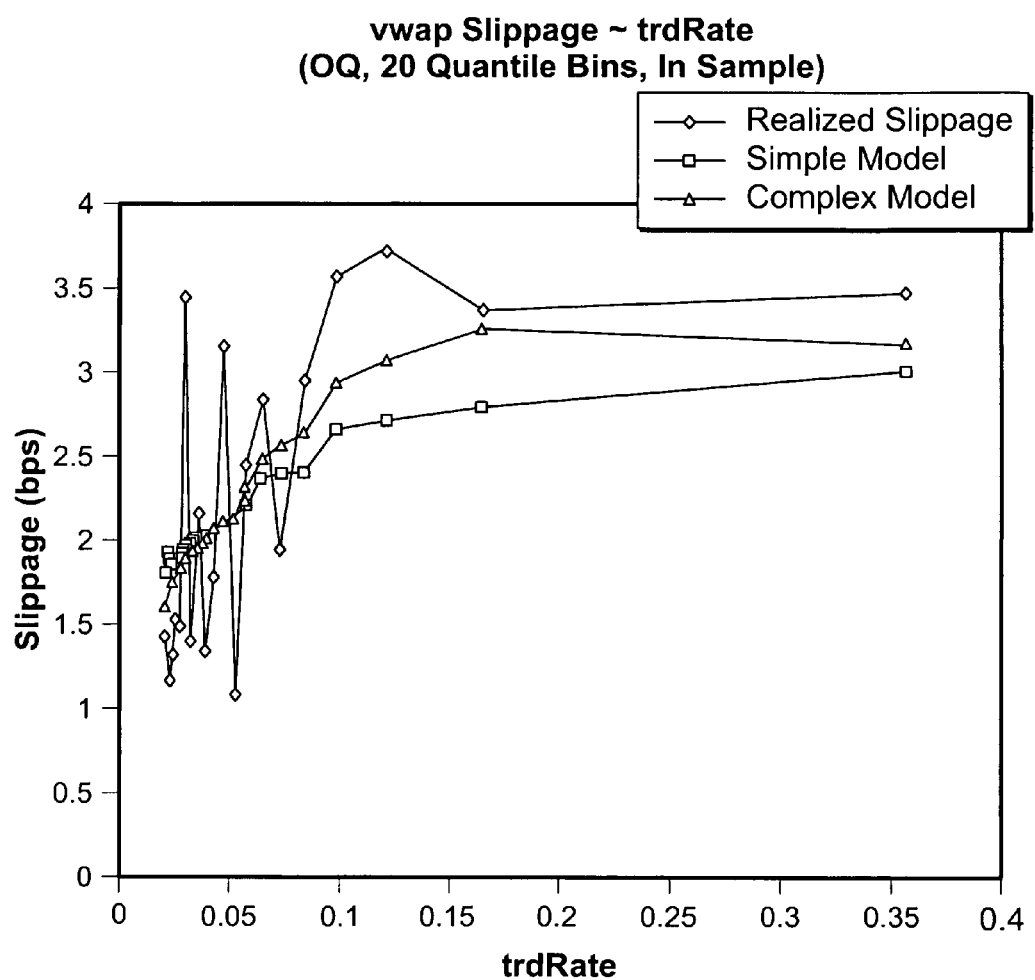

FIGS. 5 and 6 depict NASDAQ in-sample graphs (vs. spread and vs. trade rate, respectively).

Figure 7:
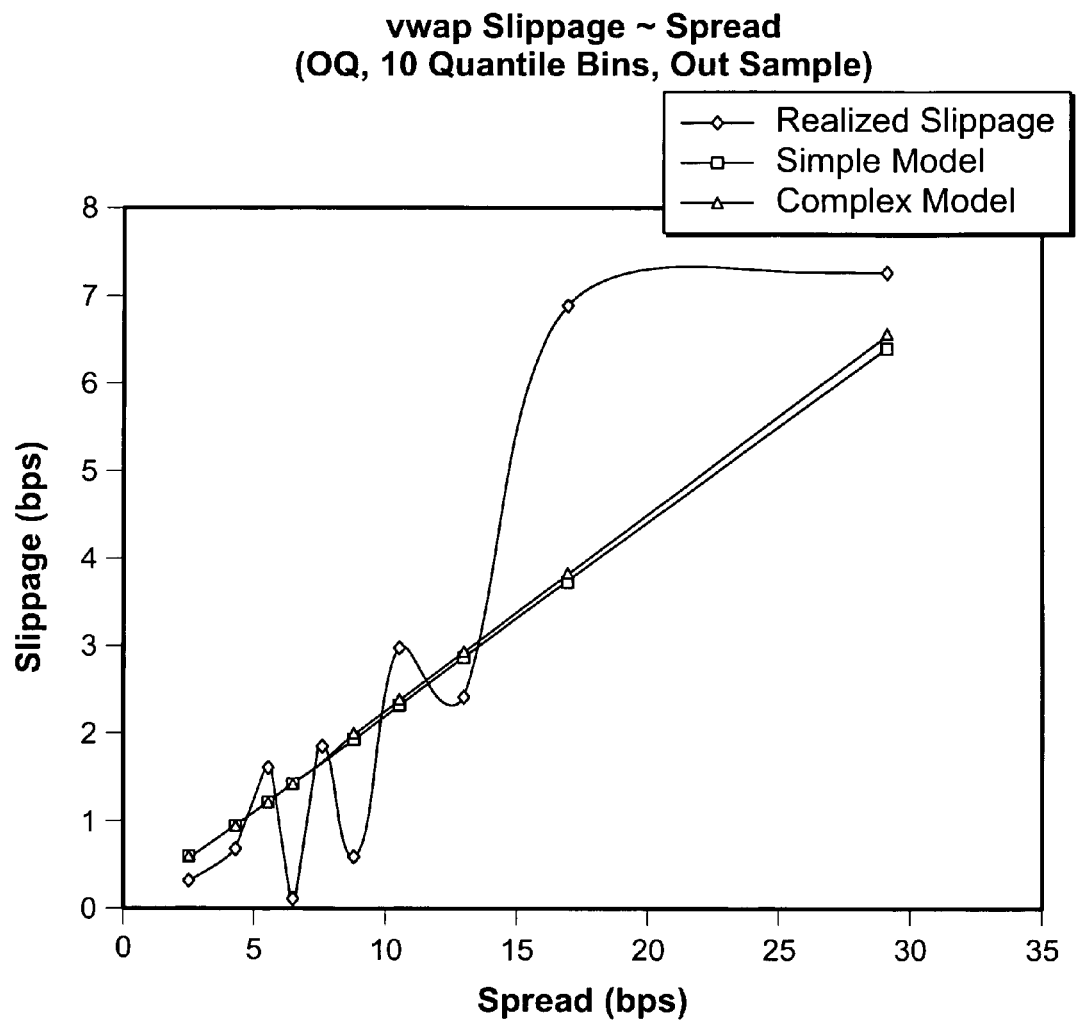
FIGS. 7 and 8 depict NASDAQ out-of-sample graphs (vs. spread and vs. trade rate, respectively).
Figure 8:
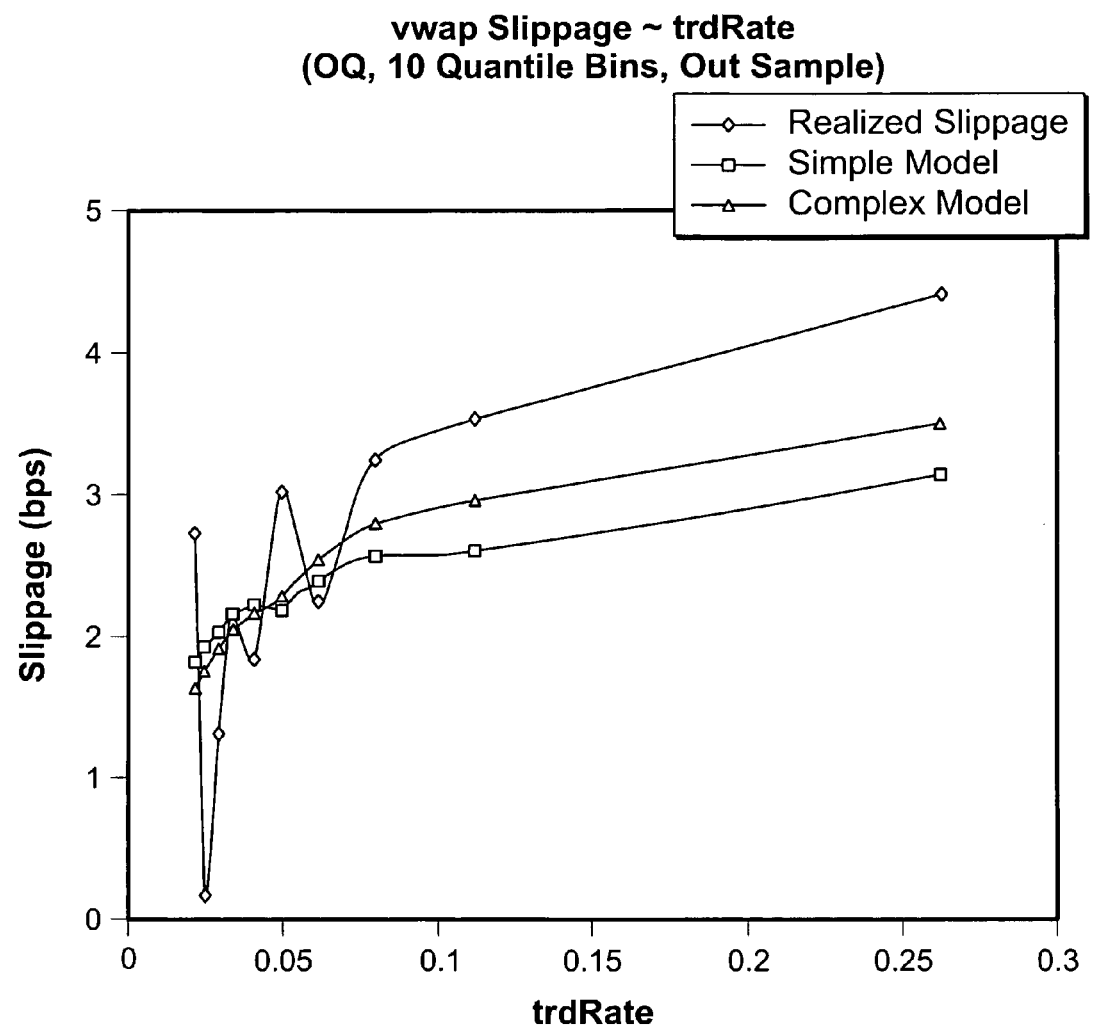
Figure 9:
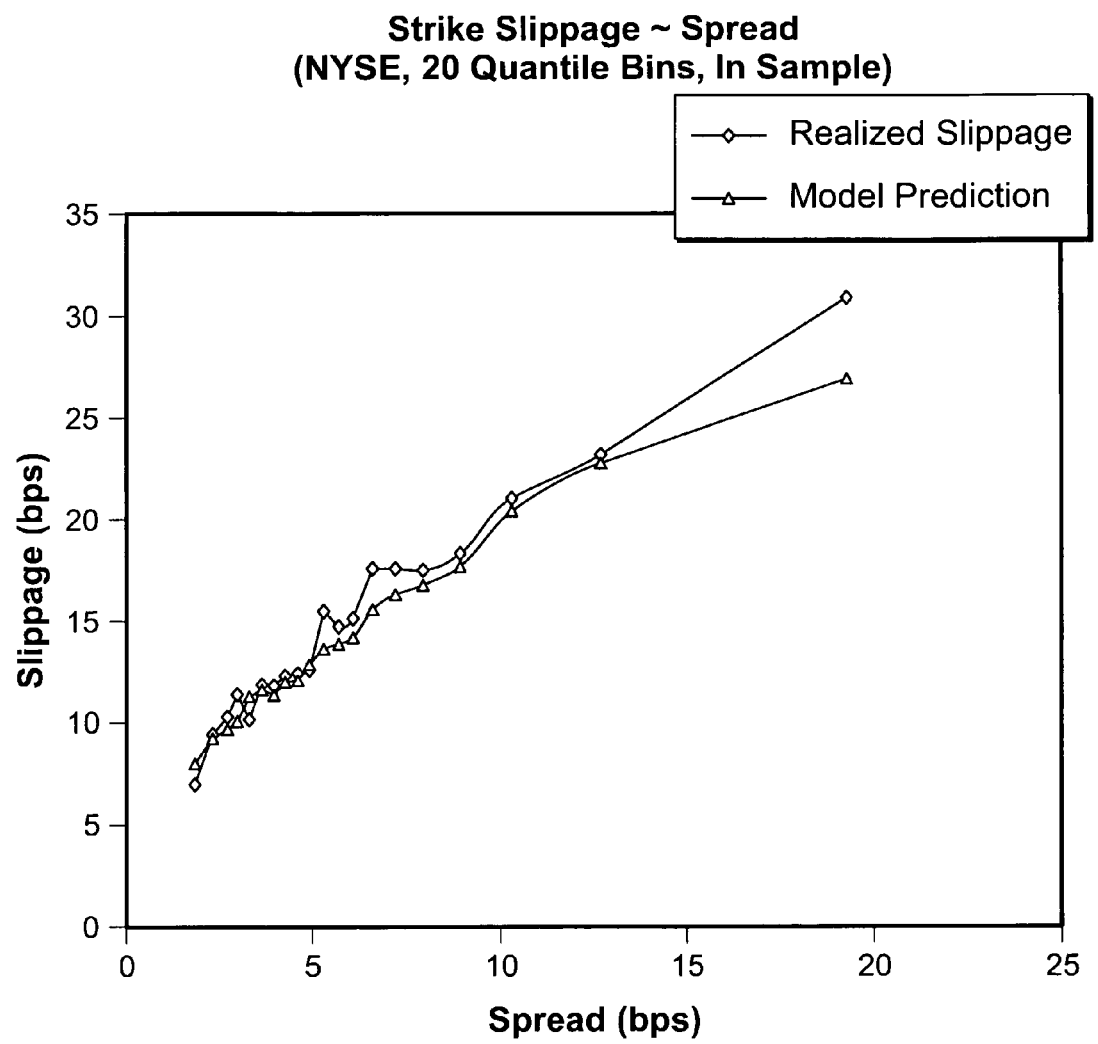
FIGS. 9-12 depict NYSE in-sample graphs (vs. spread, trade rate, percentage adv and daily volatility, respectively).
Figure 10:
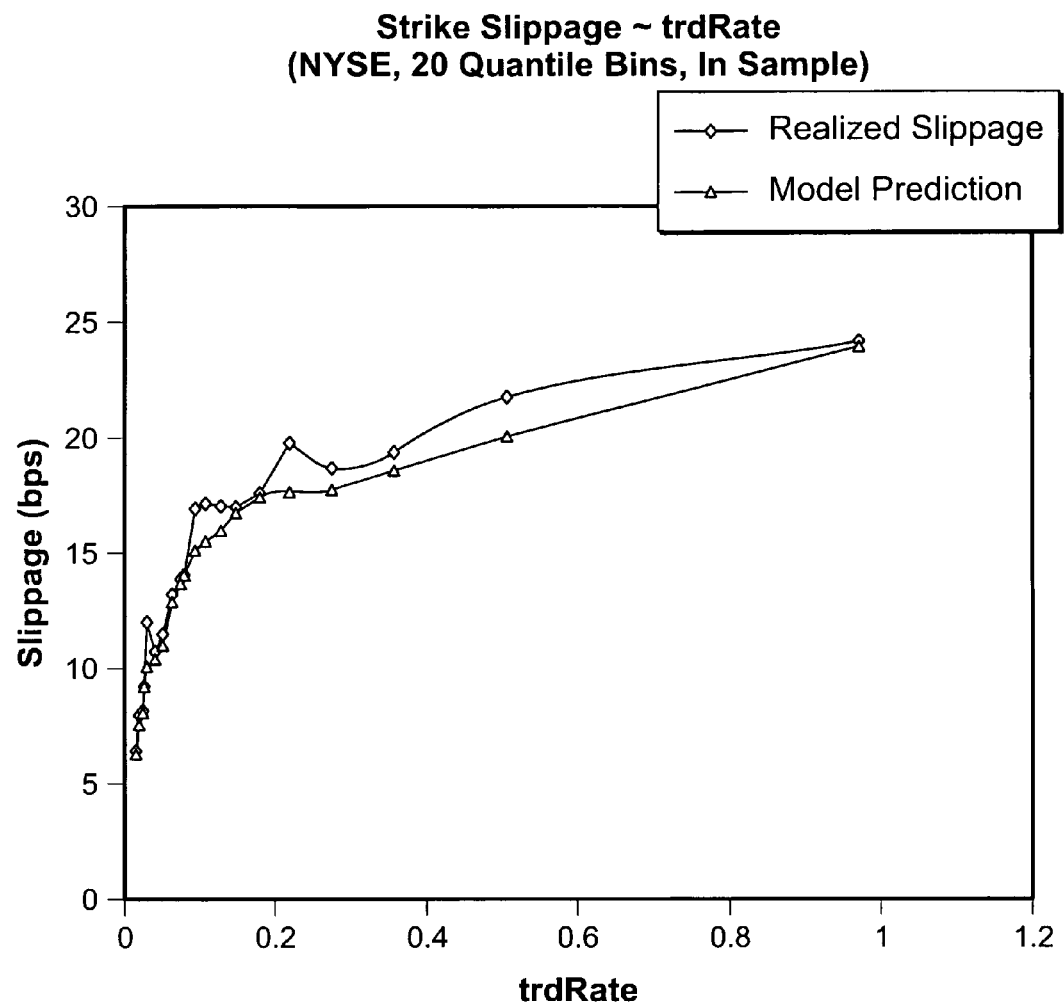
Figure 11:
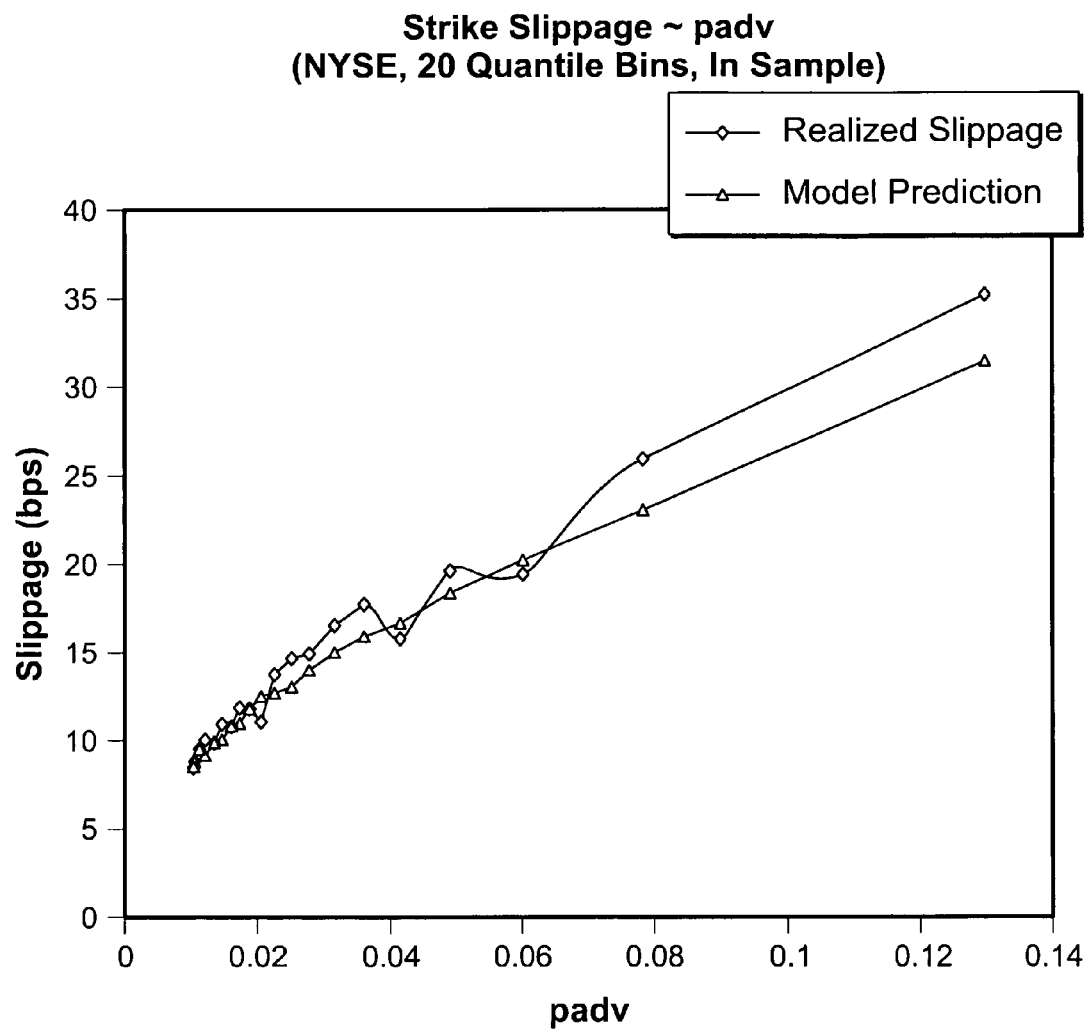
Figure 12:
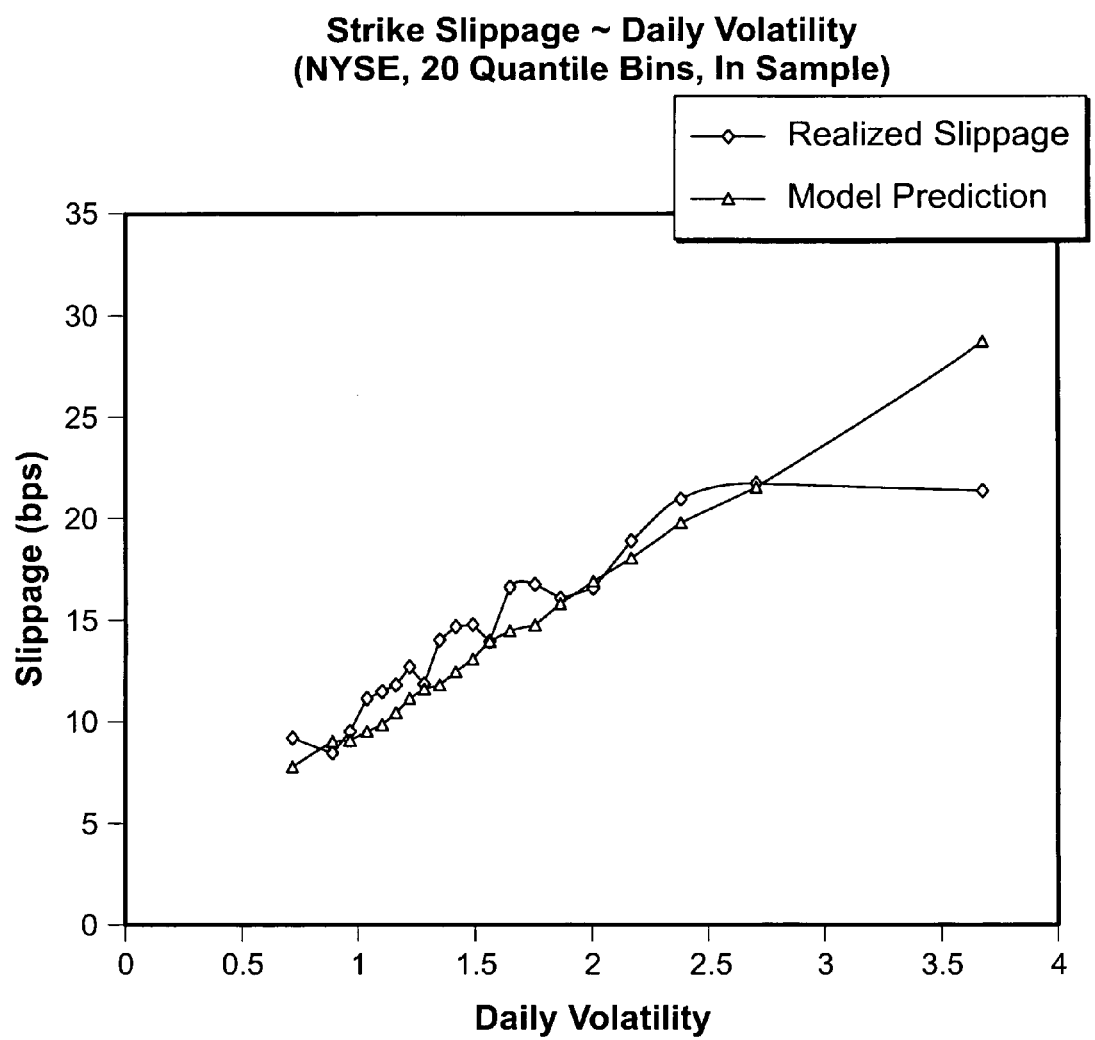
Figure 13:
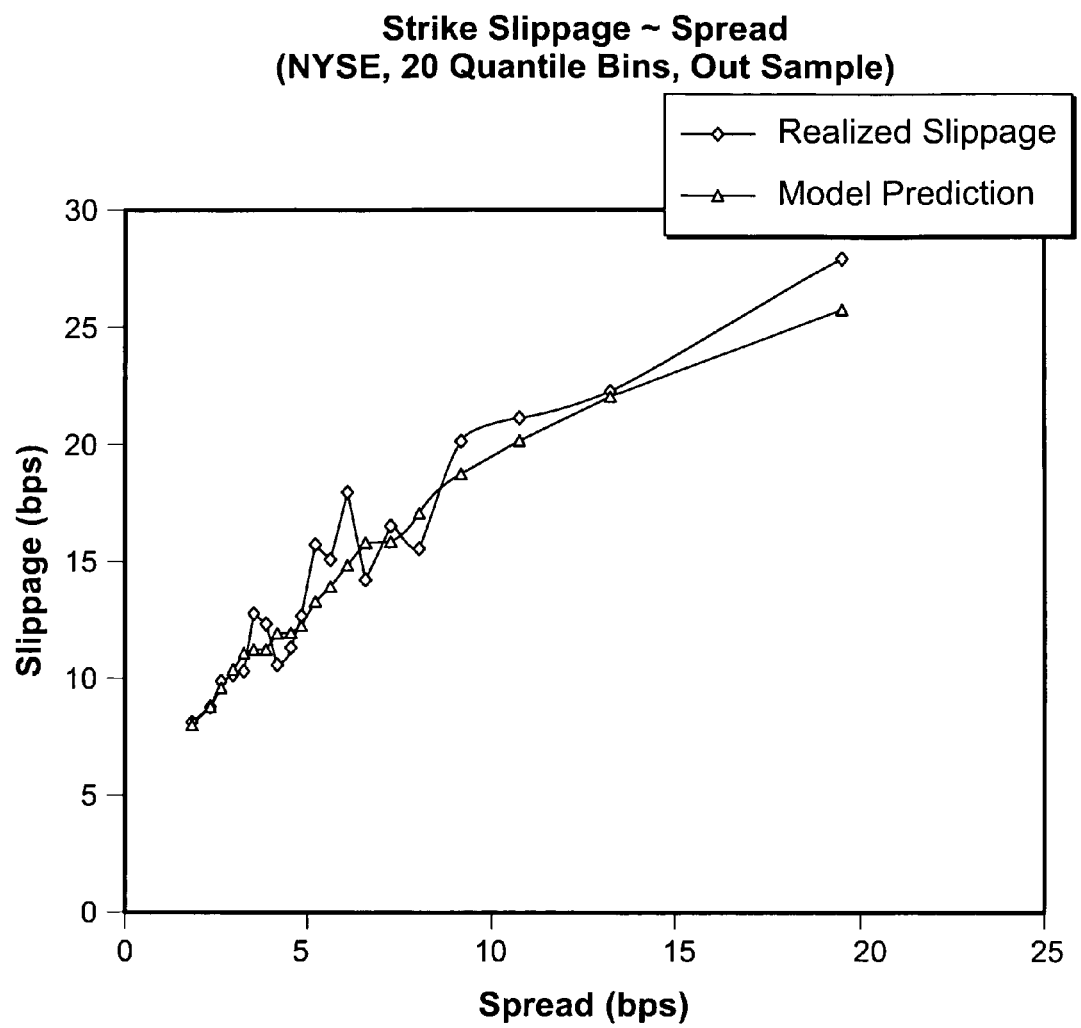
FIGS. 13-16 depict NYSE out-of-sample graphs (vs. spread, trade rate, percentage adv and daily volatility, respectively).
Figure 14:
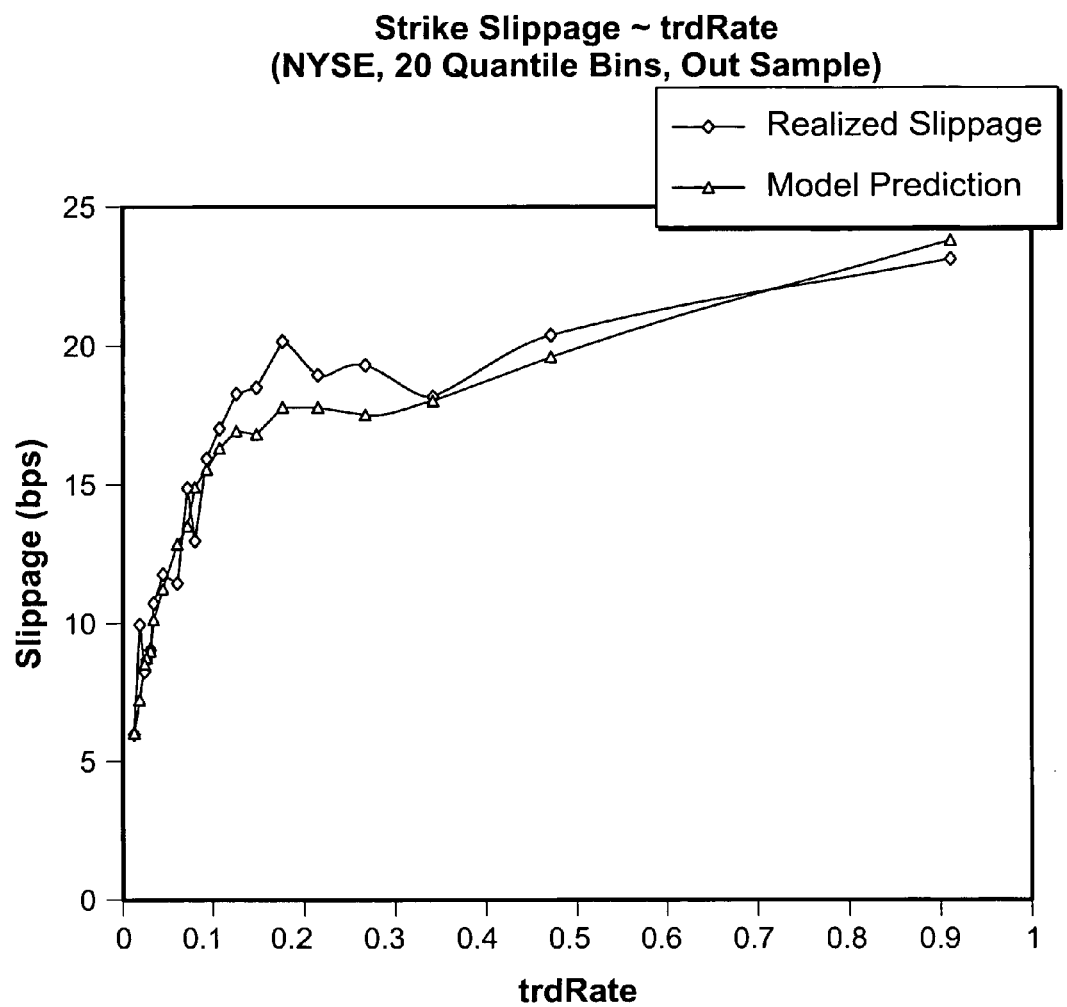
Figure 15:
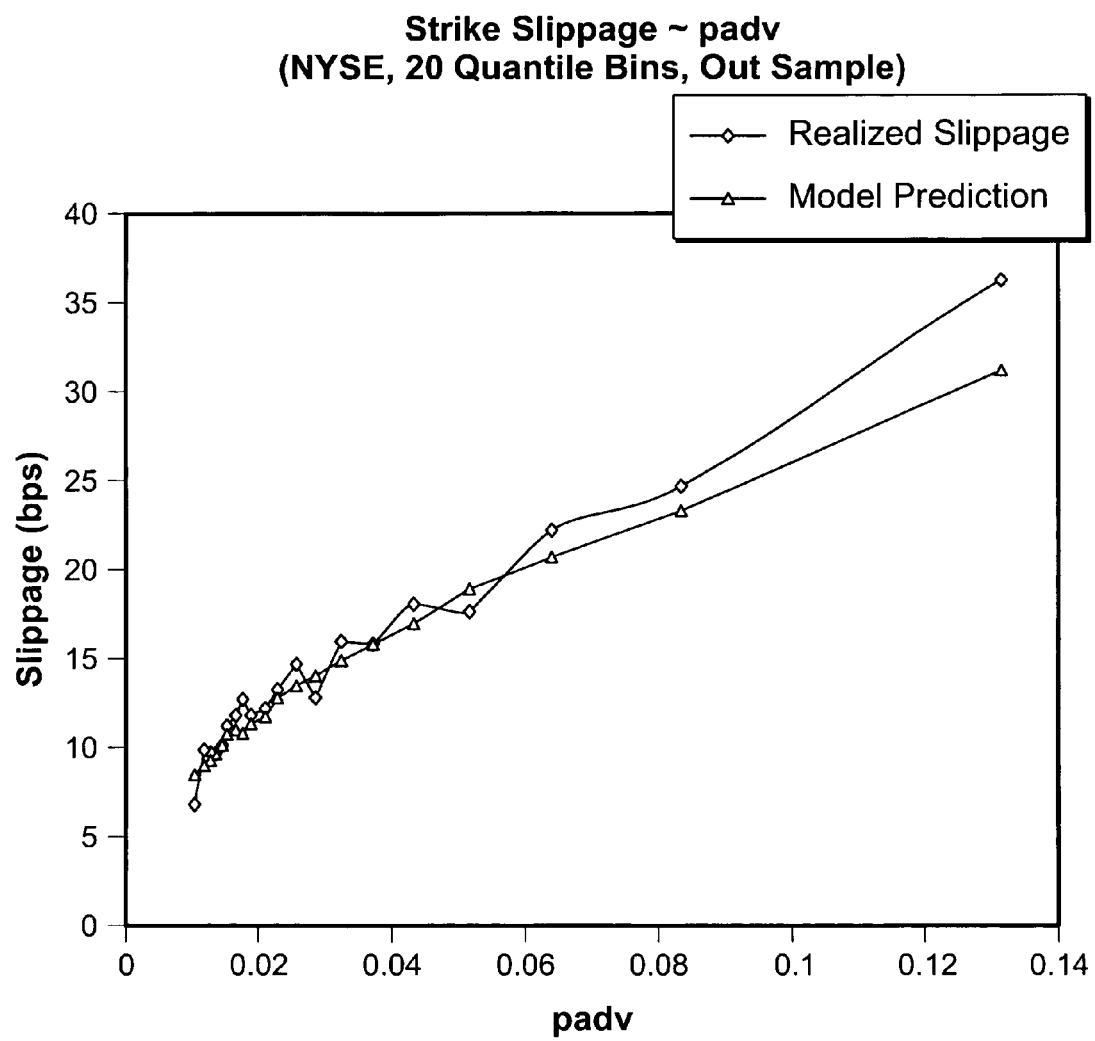
Figure 16:
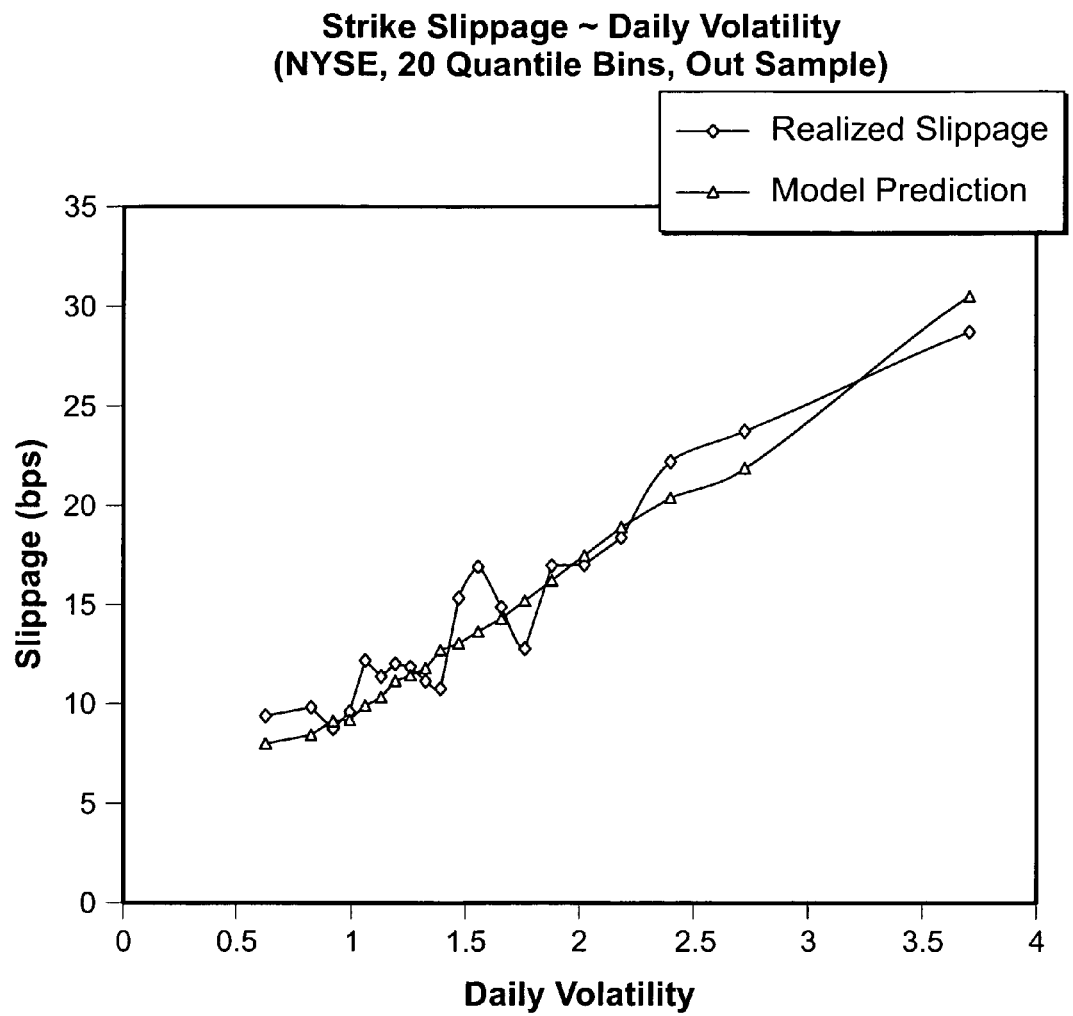
Figure 17:
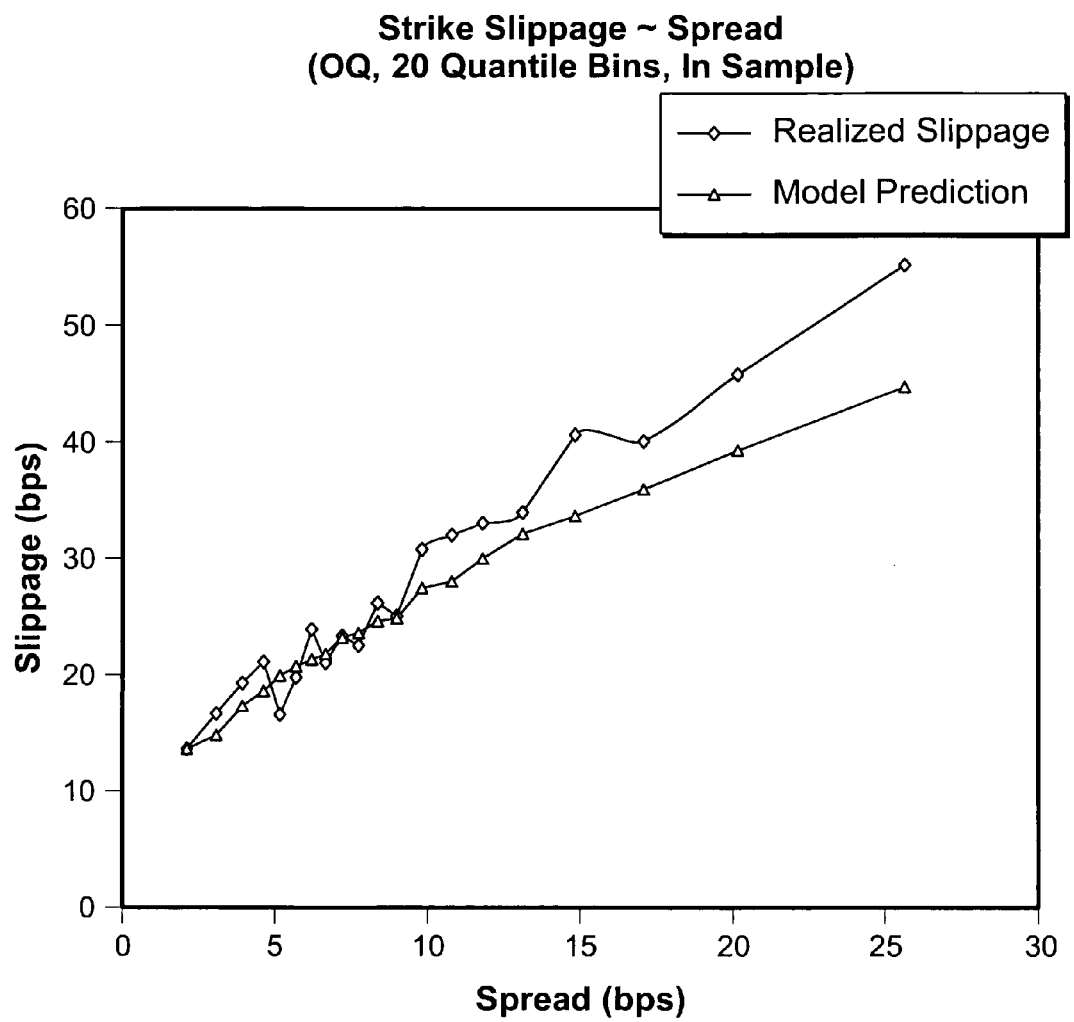
FIGS. 17-20 depict NASDAQ in-sample graphs (vs. spread, trade rate, percentage adv and daily volatility, respectively).
Figure 18:
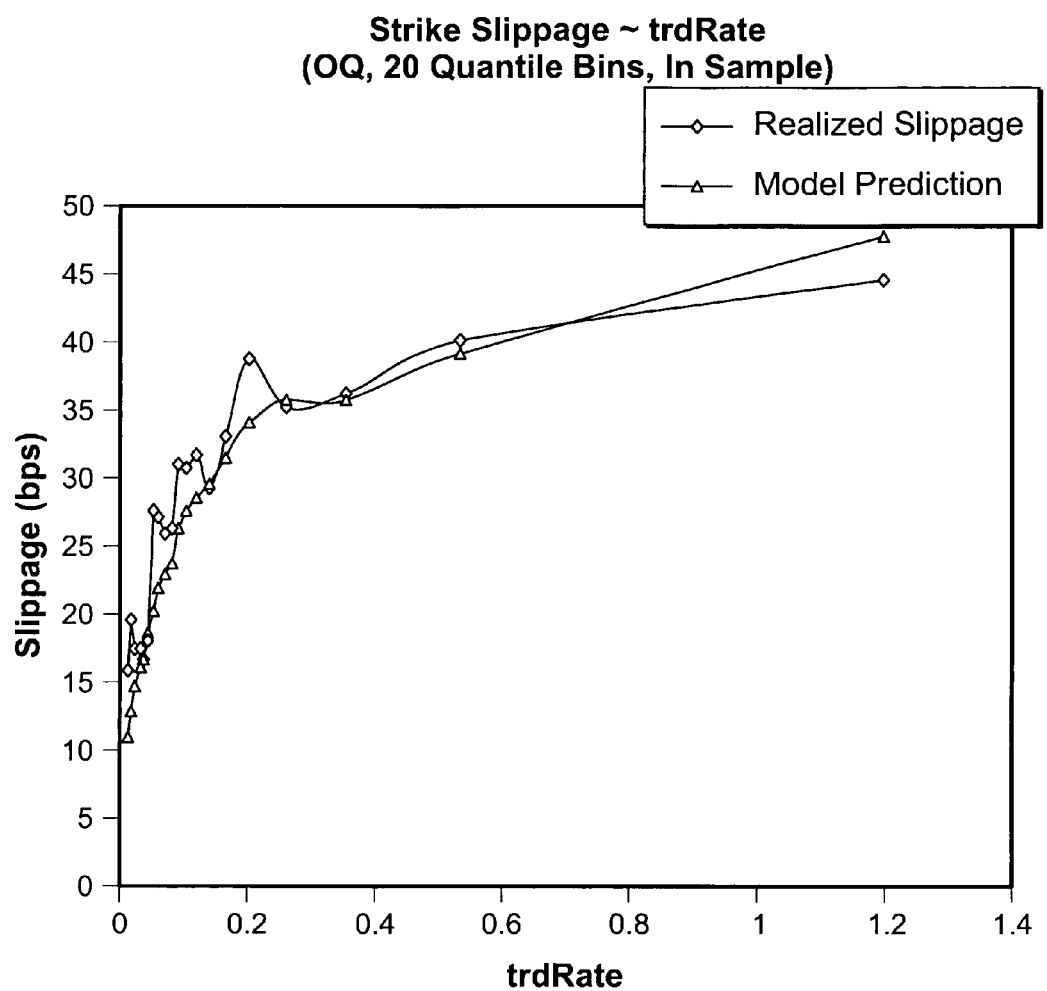
Figure 19:
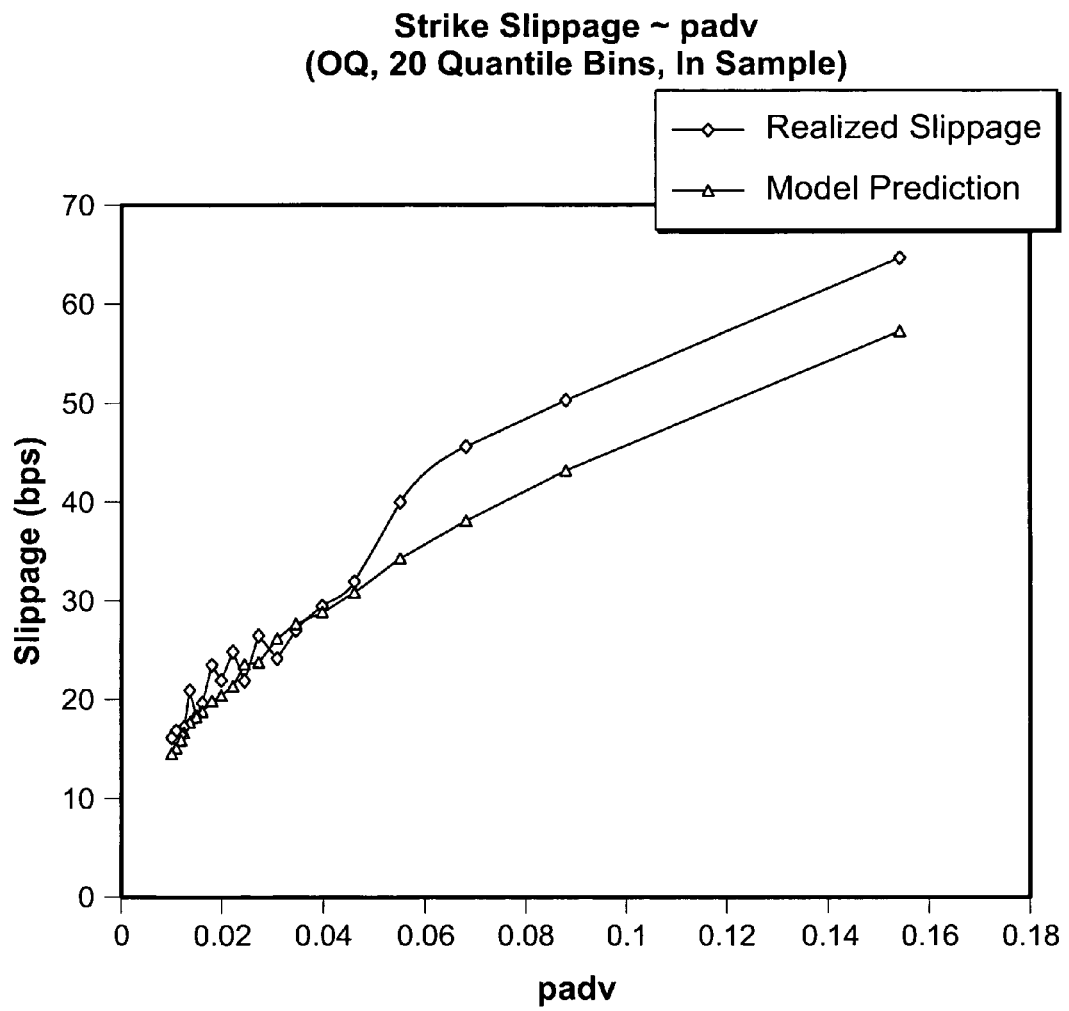
Figure 20:
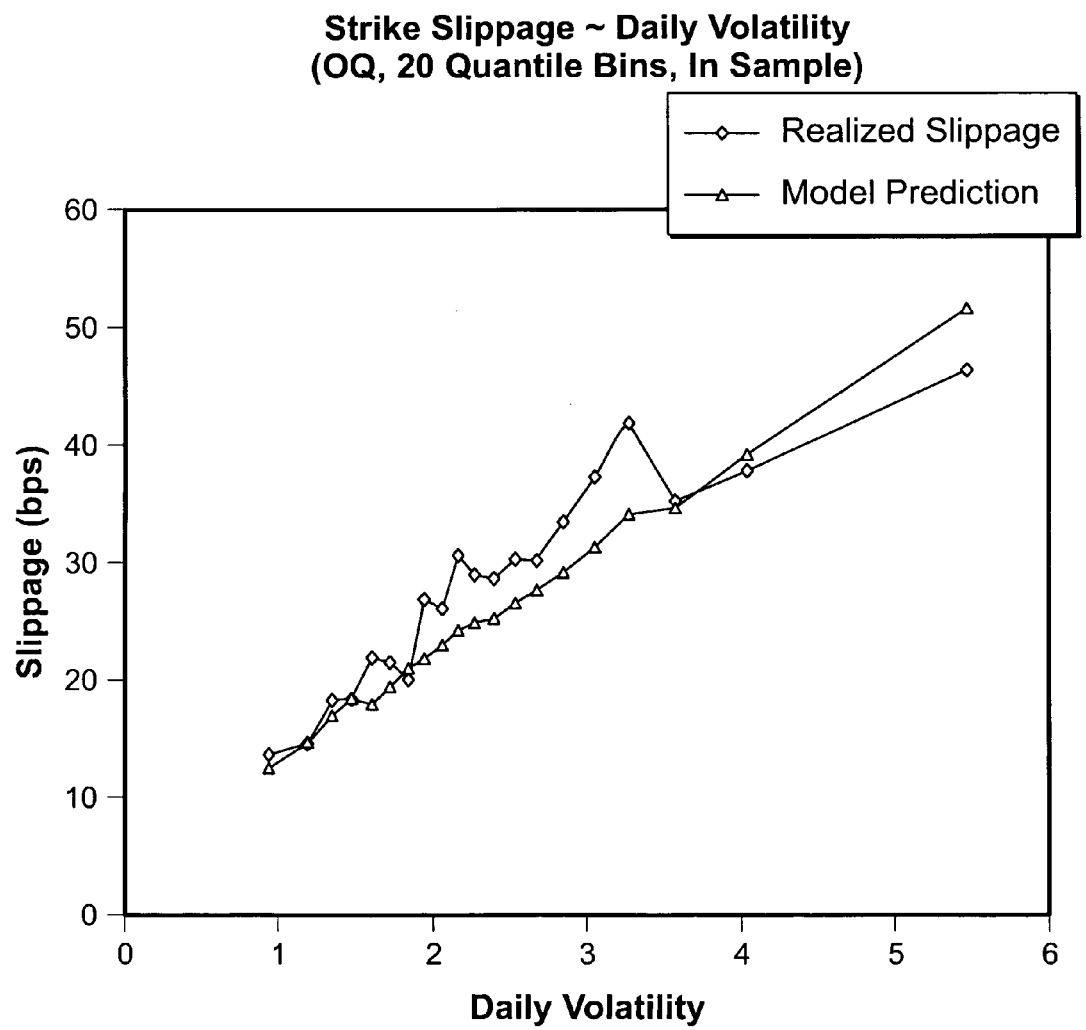
Figure 21:
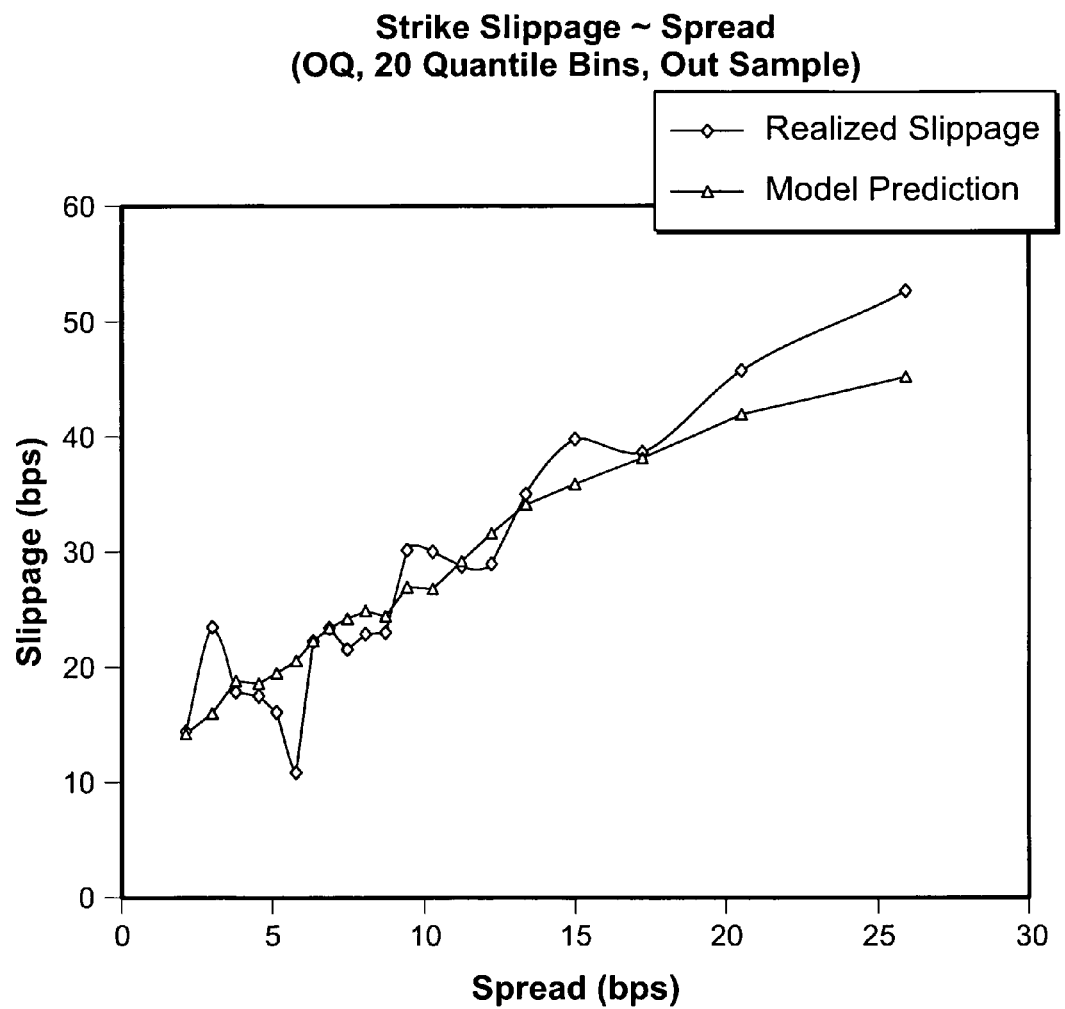
FIGS. 21-24 depict NASDAQ out-of-sample graphs (vs. spread, trade rate, percentage adv and daily volatility, respectively).
Figure 22:
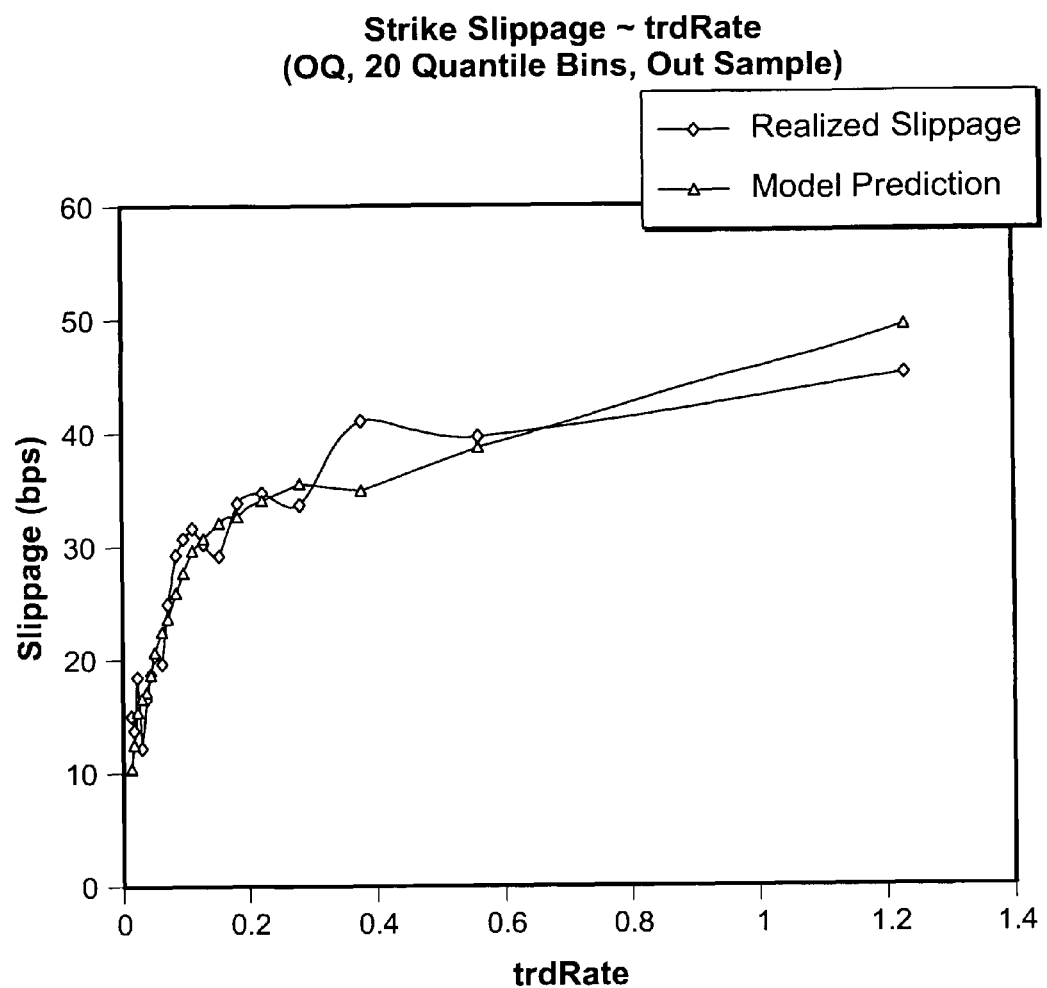
Figure 23:
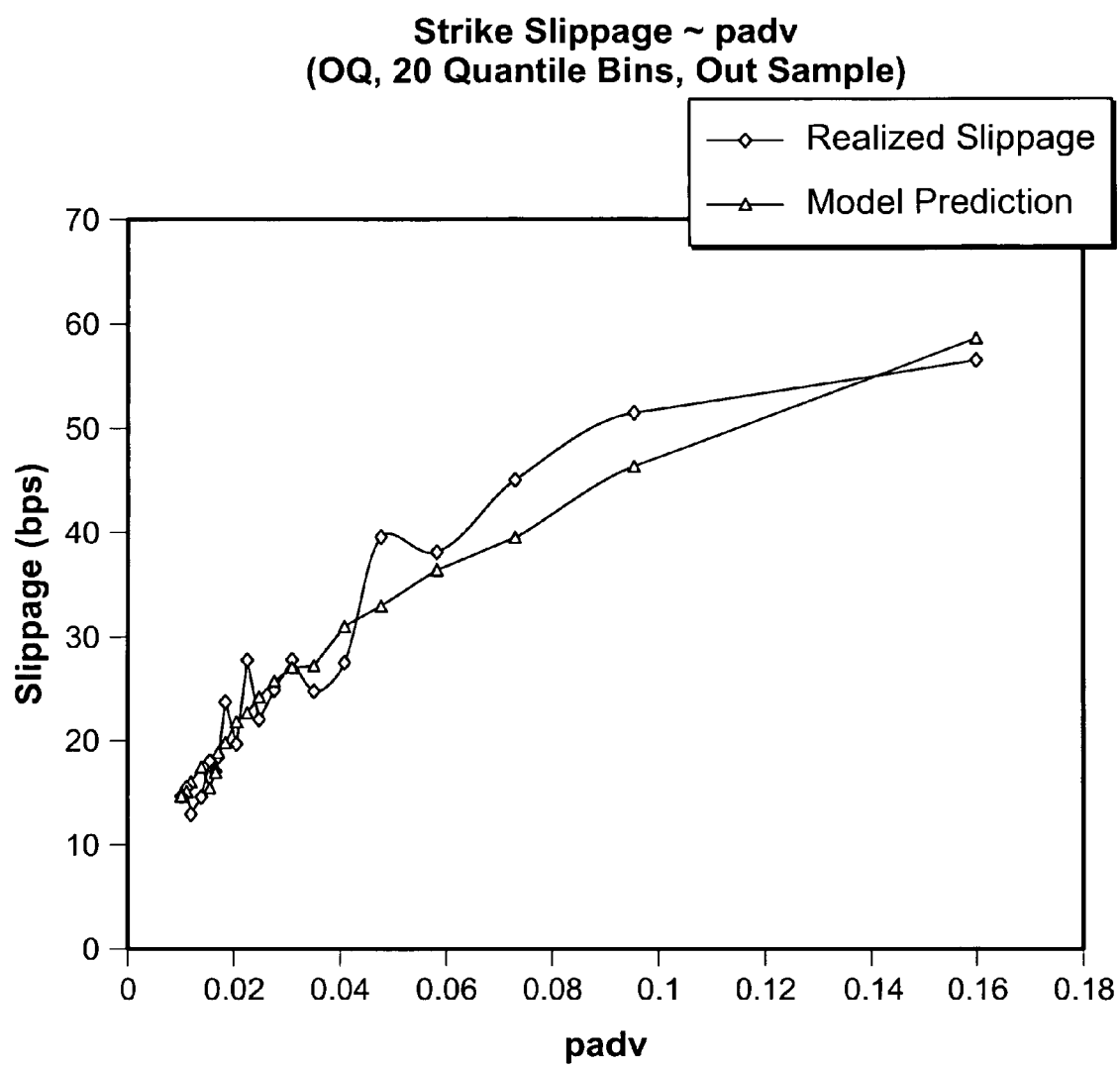
Figure 24:
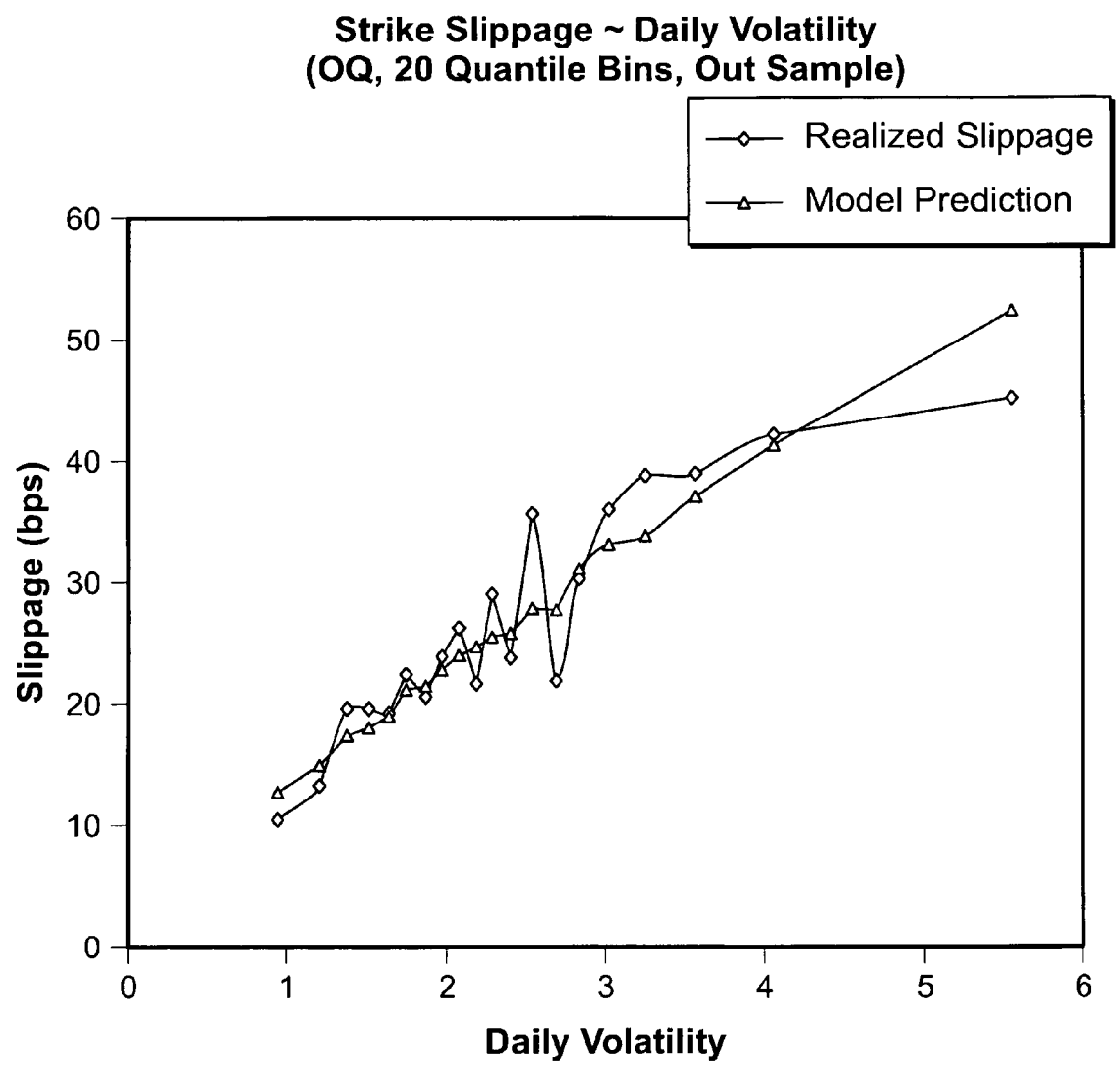

FIGS. 7 and 8 depict NASDAQ out-of-sample graphs (vs. spread and vs. trade rate, respectively).

From these graphs it can be seen that the complex model fits better than the simple model in trade rate dimension quantile bins.

Market Impact Model Fit

Permanent Impact Fit

Permanent impact refers to impacts due to changes in the equilibrium price caused by our trading, and which remain for the life of our trade. A permanent impact induced price will not mean reverse, and remains at the end price level after trading. Temporary impact induced price will reverse after our trade and eventually decay to zero. Therefore, we can capture permanent impact if we wait long enough. The following method is used to fit a preferred permanent impact model:

a. Separate trades to NYSE and NASDAQ exchanges.
b. Use function $$I_{PMN} \sim \varsigma \frac{N}{ADV_{SD}} \sigma^2$$

as a basic expression to decide the exact formula for $\varsigma$.

c. Compare results by using 3 different benchmarks: today's close, next day's open, and next day's close.
d. Compare results by adjusting (and not adjusting) market movement.

The following conclusions have been reached:

a. Permanent impact induced price is the new equilibrium price after the trade. The time to reach the new equilibrium price could be infinity. So in theory, the time to wait to measure permanent impact should be as long as possible. But the longer the waiting time, the noisier the data seen from the three benchmarks. In other words, permanent impact could only be overestimated, never underestimated, by using these three benchmarks.

b. SPRD, log(M), TO $INV_{TO}$ were tried to fit to the function ζ. Using them was not found to significantly improve performance.

c. Fitting permanent impact resulted in an intercept term and a slope term. The intercept term may be thought of as a proxy for non-fully decayed temporary impact. The slope term may be thought of as a real measure of permanent impact.

d. By using different benchmarks, both the intercept and slope terms change. Because none of them can really capture permanent impact, a range of preferred values may be used. For both NYSE and NASDAQ, the preferred coefficients range from 12 to 25. This range may be used as a starting point to fit temporary impact and then the final number may be determined from a total impact fit and an out-of-sample test.

e. After temporary impact exponents and coefficients are determined, a decay function may be derived based on the above derivation and then put back in to fit permanent impact. By doing this iteratively, the results should converge.

Temporary Impact and Total Impact Fit

After instantaneous impact and permanent impact coefficient ranges are determined, the previous results may be used to fit temporary impact. The following steps are preferred:

a. Different exchanges are analyzed separately.

b. Use function form $I_{TMP} \sim \eta v^\alpha (\sigma \sqrt{T})^\beta$ as a basic expression to find α, β and η.

c. Use function form $I_{MKT} = I_{INS} + I_{PMN} + I_{TMP} + (c \cdot \sigma \sqrt{T}) \epsilon$ as the expression to decide the final market impact formula; the heteroscedasticity is adjusted by using weighted regressions. $\epsilon \sim N(0,1)$.

d. Compare results by using different instantaneous impact functions, different permanent impact coefficients, and different temporary impact exponent combinations.

e. Compare results from adjusting (and not adjusting) market movement.

f. Use Weighted least square, weighted nonlinear least square, and ridge regression techniques.

g. In-sample results are tested in out-of-sample data.

The following conclusions have been reached:

a. NYSE and NASDAQ display similar behavior in terms of temporary impact exponents.

b. Log(M), SPRD and TO $INV_{TO}$ were tried into η; adding them did not improve performance significantly.

c. The $R^2$ is above 3% for the NYSE dataset and is above 5% for the NASDAQ dataset.

d. β<1, which indicates temporary impact decays and mean reverts gradually.

e. The stock price trajectory during our trade and after our trade may be derived according to the above description.

f. Optimal trading horizon and optimal trade scheduling may be derived based on the model given for different benchmarks (strike, VWAP, close, etc).

The model used in a preferred embodiment is:

$$I_{MKT} = C_{sprd} SPRD + C_{perm} \sigma^2 \frac{N}{ADV_{5D}} + C_{temp} v^\alpha (\sigma \sqrt{T})^\beta$$

$C_{sprd}$, $C_{perm}$, $C_{temp}$, α and β are calibrated separately for both NYSE and NASDAQ FIGS. 9-24 display in sample and out sample fitting results by comparing realized slippage and model prediction for different variable bins. The horizontal axis corresponds to independent variables (spread, trade rate, percentage adv and daily volatility); and the vertical axis corresponds to slippage. Each graph has two lines: one line is realized slippage from the data; the other line is model prediction using the model of the above-described embodiment.

FIGS. 9-12 depict NYSE in-sample graphs (vs. spread, trade rate, percentage adv and daily volatility, respectively).

FIGS. 13-16 depict NYSE out-of-sample graphs (vs. spread, trade rate, percentage adv and daily volatility, respectively).

FIGS. 17-20 depict NASDAQ in-sample graphs (vs. spread, trade rate, percentage adv and daily volatility, respectively).

FIGS. 21-24 depict NASDAQ out-of-sample graphs (vs. spread, trade rate, percentage adv and daily volatility, respectively).

From these graphs, it is clear that the preferred model fits the data well.

Application

Pre-Trade Analysis

A preferred market impact model may be used to predict implementation shortfall and VWAP slippage to help buy-side customers determine the best algorithms to use. It also may help traders calculate the expected market impact of potential trades.

Select Optimal Trading Horizon

The preferred market impact model provides a framework for deciding in which period to trade. Based on the model: if other factors remain the same, the longer period of trading, the lower the impact. However, from a risk perspective, the longer period of trading, the bigger the risk. So there is a trade-off between impact and risk. For different urgency levels, different optimal trading horizons may be calculated based on the model.

Predict Trade Trajectory

Based on the description above, the price trajectory may be derived from a convolution between an impulse function (a function of trade rate) and an impulse response function (a function of volatility and duration). The impulse function and impulse response function may be fit using execution data. These functions may then be applied to any arbitrary trade schedule, and the corresponding price trajectory can be derived.

Select Optimal Trade Scheduling

As discussed above, for any given trade schedule, the corresponding price trajectory can be derived. From the derived price trajectory, VWAP and end price may be derived. Then for any given benchmark (e.g., strike, VWAP, or end price), optimal trade scheduling may be derived, based on the preferred model.

Post-Trade Performance Attribution

After a trade has finished, post-trade analysis may be used to analyze the performance. Both return contribution and cost attribution may be derived from the preferred model.

In summary, a preferred market impact model is decomposed into three parts: instantaneous impact, temporary impact and permanent impact. The instantaneous impact part preferably is linked to VWAP slippage. An empirical model may be used to obtain a preferred VWAP slippage model based on a VWAP benchmark. The model may then be applied to instantaneous impact part of total market impact.

Based on a linear superposition assumption, a dimensionless argument and a non-arbitrage requirement, permanent impact may be assumed to be of the form $$I_{PMN} \sim \varsigma \frac{N}{ADV_{5D}} \sigma^2$$

and temporary impact is assumed to be $I_{IMP} \sim \eta v^\alpha (\sigma\sqrt{T})^\beta$.

A permanent impact coefficient $\varsigma$ and related coefficients may be derived using different benchmarks: trading day's close, next day's open and next day's close. An estimated range for the permanent impact coefficient $\varsigma$ is obtained, then this range is used to fit temporary impact exponents and coefficients.

After getting the empirical model, both in-sample and out-of-sample tests may be conducted to verify the model.

The closed form for the model is:

Market Impact (Cost) =

Instantaneous Impact + Temporary Impact + Permanent Impact =

$$I_{INS} + I_{PMN} + I_{TMP} =$$

(function of trade rate)(spread) + $\left(\text{multiple of } \varsigma \frac{X}{ADV}\sigma^2\right)$ +

$\left(\text{multiple of } \eta v^\alpha (\sigma\sqrt{T})^\beta\right) = ae + b\sigma^2 X/ADV + cv^\alpha \sigma^\beta$ where Cost is the expected cost over the duration of trading, constants a, b, c, $\alpha$ and $\beta$ are values associated with various markets around the world, e represents the average bid-ask spread of the security, X represents the size of the order, ADV represents the average daily volume traded of the security, $\sigma$ represents the expected historical volatility of the security over the trading interval, and v represents the average rate of trading over the trading interval (X/ADV·T), where T is the trading duration in number of days.

The preferred market impact model may be used for pre-trade analysis, optimal horizon calculation, price trajectory prediction, optimal trade scheduling and post-trade performance attribution.

Other embodiments comprise one or more of the following:
1) Separate datasets by different market cap, start time, end time, duration, and trading strategy to test whether there are significant differences between different datasets.
2) Apply the model to block trades data to see whether it is applicable to large trades. If not, build a separate model for block trades.
3) Incorporate stock correlation into the model. Correlation with the main indices and sectors may be used.
4) Compare results with a market micro structure study to determine consistency.
5) Examine child order data to identify additional effects.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

For example, all calculations preferably are performed by one or more computers. Moreover, all notifications and other communications, as well as all data transfers, to the extent allowed by law, preferably are transmitted electronically over a computer network. Further, all data preferably is stored in one or more electronic databases.

In general, although particular embodiments of the invention have been described in detail for the purpose of illustration, it is to be understood that such detail is solely for that purpose and that variations can be made thereof by those skilled in the art without departing from the scope of the invention, which should be determined exclusively from the plain wording of the appended claims. Any details in the specification that are not included in the claims themselves should not be construed as limiting the scope of the invention.

We claim:

1. A system comprising:
    one or more computer processors operable to calculate an average bid-ask spread of said one or more securities;
    one or more computer processors operable to calculate values associated with one or more markets;
    one or more computer processors operable to receive and store data regarding an order size for said one or more securities;
    one or more computer processors operable to receive and store data regarding an average daily volume of said one or more securities traded on a specified market;
    one or more computer processors operable to calculate data regarding expected historical volatility over a trading interval of said one or more securities;
    one or more computer processors operable to calculate data regarding an average rate of trading over said trading interval of said one or more securities; and
    one or more computer processors operable to calculate an estimated cost of trading said one or more securities using data comprising a formula based on said average bid-ask spread, said values associated with one or more markets, said data regarding order size, said data regarding average daily volume, said data regarding expected historical volatility, and said data regarding an average rate of trading over said trading interval;
    wherein said formula comprises an instantaneous impact component, a temporary impact component and a permanent impact component, and
    wherein the temporary impact component comprises a multiplicative product of at least one of a power of said average rate of trading and a power of said expected historical volatility.

2. The system as in claim 1, wherein the permanent impact component comprises a multiplicative product of at least one of said values associated with one or more markets, a square of said expected historical volatility, and a ratio of said order size to said average daily volume.

3. The system as in claim 1, wherein the temporary impact component has the form:

$$I_{TMP} = cv^\alpha \sigma^\beta$$

where $I_{TMP}$ is a temporary impact of the estimated cost of trading said one or more securities, constants c, $\alpha$ and $\beta$ are values associated with various markets, $\sigma$ represents expected historical volatility of said one or more securities over said trading interval, and v represents an average rate of trading over said trading interval.

4. The system as in claim 1, wherein the instantaneous impact component comprises a multiplicative product of at least one of said values associated with one or more markets and said average bid-ask spread.

5. The system as in claim 1, wherein said formula comprises a sum of the instantaneous impact component, the temporary impact component and the permanent impact component.

6. The system as in claim 5, wherein said formula has the form:

$$\text{Cost} = ae + b\sigma^2 X/\text{ADV} + cv^\alpha \sigma^\beta$$

where Cost is the estimated cost of trading said one or more securities, constants a, b, c, $\alpha$ and $\beta$ are values associated with various markets, e represents an average bid-ask spread of said one or more securities, X represents said order size, ADV represents average daily volume traded of said one or more securities, $\sigma$ represents expected historical volatility of said one or more securities over said trading interval, and v represents an average rate of trading over said trading interval.

7. The system as in claim 1, wherein at least one of said values associated with one or more markets is related to trade rate.

8. The system as in claim 1, wherein at least one of said values associated with one or more markets is related to security-specific variables.

9. The system as in claim 8, wherein said security-specific variables comprise one or more of spread, market capitalization, and turnover.

10. A computer readable storage medium having stored thereon computer-executable instructions which, when executed by a processor, perform a method of:
calculating an average bid-ask spread of said one or more securities; calculating values associated with one or more markets; receiving and storing data regarding an order size for said one or more securities;
receiving and storing data regarding an average daily volume of said one or more securities traded on a specified market;
calculating data regarding expected historical volatility over a trading interval of said one or more securities;
calculating data regarding an average rate of trading over said trading interval of said one or more securities; and
calculating an estimated cost of trading said one or more securities using data comprising a formula based on said average bid-ask spread, said values associated with one or more markets, said data regarding order size, said data regarding average daily volume, said data regarding expected historical volatility, and said data regarding an average rate of trading over said trading interval;
wherein said formula comprises an instantaneous impact component, a temporary impact component and a permanent impact component, and
wherein the temporary impact component comprises a multiplicative product of at least one of a power of said average rate of trading and a power of said expected historical volatility.

11. The computer readable storage medium of claim 10, wherein the permanent impact component comprises a multiplicative product of at least one of said values associated with one or more markets, a square of said expected historical volatility, and a ratio of said order size to said average daily volume.

12. The computer readable storage medium of claim 11, wherein the temporary impact component has the form:

$$I_{TMP} = cv^\alpha \sigma^\beta$$

where $I_{TMP}$ is a temporary impact of the estimated cost of trading said one or more securities, constants c, $\alpha$ and $\beta$ are values associated with various markets, $\sigma$ represents expected historical volatility of said one or more securities over said trading interval, and v represents an average rate of trading over said trading interval.

13. The computer readable storage medium of claim 12, wherein said formula comprises a sum of the instantaneous impact component, the temporary impact component and the permanent impact component.

14. The computer readable storage medium of claim 13, wherein said formula has the form:

$$\text{Cost} = ae + b\sigma^2 X/\text{ADV} + cv^\alpha \sigma^\beta$$

where Cost is the estimated cost of trading said one or more securities, constants a, b, c, $\alpha$ and $\beta$ are values associated with various markets, e represents an average bid-ask spread of said one or more securities, X represents said order size, ADV represents average daily volume traded of said one or more securities, $\sigma$ represents expected historical volatility of said one or more securities over said trading interval, and v represents an average rate of trading over said trading interval.

15. The computer readable storage medium of claim 11, wherein the instantaneous impact component comprises a multiplicative product of at least one of said values associated with one or more markets and said average bid-ask spread.

16. The computer readable storage medium of claim 10, wherein at least one of said values associated with one or more markets is related to trade rate.

17. The computer readable storage medium of claim 10, wherein at least one of said values associated with one or more markets is related to security-specific variables.

18. The computer readable storage medium of claim 17, wherein said security-specific variables comprise one or more of spread, market capitalization, and turnover.

19. A computer-implemented method comprising:
calculating, using one or more processors, an average bid-ask spread of said one or more securities;
calculating, using one or more processors, values associated with one or more markets;
receiving and storing data, in one or more databases, regarding an order size for said one or more securities;
receiving and storing data, in one or more databases, regarding an average daily volume of said one or more securities traded on a specified market;
calculating, using one or more processors, data regarding expected historical volatility over a trading interval of said one or more securities;
calculating, using one or more processors, data regarding an average rate of trading over said trading interval of said one or more securities; and
calculating, using one or more processors, an estimated cost of trading said one or more securities using data comprising a formula based on said average bid-ask spread, said values associated with one or more markets, said data regarding order size, said data regarding average daily volume, said data regarding expected historical volatility, and said data regarding an average rate of trading over said trading interval;
wherein said formula comprises an instantaneous impact component, a temporary impact component and a permanent impact component, and
wherein the temporary impact component comprises a multiplicative product of at least one of a power of said average rate of trading and a power of said expected historical volatility.

20. The method as in claim 19, wherein the permanent impact component comprises a multiplicative product of at least one of said values associated with one or more markets, a square of said expected historical volatility, and a ratio of said order size to said average daily volume.

21. The method as in claim 20, wherein the temporary impact component has the form:

$$I_{TMP}=cv^\alpha\sigma^\beta$$

where $I_{TMP}$ is a temporary impact of the estimated cost of trading said one or more securities, constants c, $\alpha$ and $\beta$ are values associated with various markets, $\sigma$ represents expected historical volatility of said one or more securities over said trading interval, and v represents an average rate of trading over said trading interval.

22. The method as in claim 21, wherein said formula comprises a sum of the instantaneous impact component, the temporary impact component and the permanent impact component.

23. The method as in claim 22, wherein said formula has the form:

$$\text{Cost}=ae+b\sigma^2 X/\text{ADV}+cv^\alpha\sigma^\beta$$

where Cost is the estimated cost of trading said one or more securities, constants a, b, c, $\alpha$ and $\beta$ are values associated with various markets, e represents an average bid-ask spread of said one or more securities, X represents said order size, ADV represents average daily volume traded of said one or more securities, $\sigma$ represents expected historical volatility of said one or more securities over said trading interval, and v represents an average rate of trading over said trading interval.

24. The method as in claim 20, wherein the instantaneous impact component comprises a multiplicative product of at least one of said values associated with one or more markets and said average bid-ask spread.

25. The method as in claim 19, wherein at least one of said values associated with one or more markets is related to trade rate.

26. The method as in claim 19, wherein at least one of said values associated with one or more markets is related to security-specific variables.

27. The method as in claim 26, wherein said security-specific variables comprise one or more of spread, market capitalization, and turnover.

* * * * *